(12) United States Patent
Vanzandt et al.

(10) Patent No.: US 11,913,692 B2
(45) Date of Patent: Feb. 27, 2024

(54) HEAT EXCHANGER INTEGRATION WITH MEMBRANE SYSTEM FOR EVAPORATOR PRE-CONCENTRATION

(71) Applicant: Via Separations, Inc., Watertown, MA (US)

(72) Inventors: Kyle Vanzandt, Watertown, MA (US); Marcus Lundgren, Cambridge, MA (US); Brent D. Keller, Somerville, MA (US)

(73) Assignee: Via Separations, Inc., Watertown, MA (US)

( * ) Notice: Subject to any disclaimer, the term of this patent is extended or adjusted under 35 U.S.C. 154(b) by 0 days.

(21) Appl. No.: 18/141,316

(22) Filed: Apr. 28, 2023

(65) Prior Publication Data

US 2023/0258378 A1 Aug. 17, 2023

Related U.S. Application Data

(63) Continuation of application No. PCT/US2022/080120, filed on Nov. 18, 2022.

(60) Provisional application No. 63/283,767, filed on Nov. 29, 2021.

(51) Int. Cl.
*B01D 71/02* (2006.01)
*F25B 43/00* (2006.01)

(52) U.S. Cl.
CPC ............ *F25B 43/00* (2013.01); *B01D 71/024* (2013.01); *B01D 2311/04* (2013.01); *B01D 2311/106* (2013.01)

(58) Field of Classification Search
CPC .................... B01D 2311/04; B01D 2311/106; F25B 43/00
See application file for complete search history.

(56) References Cited

U.S. PATENT DOCUMENTS

| 3,457,171 A | 7/1969 | Flowers et al. |
| 3,839,201 A | 10/1974 | Miller |
| 4,337,154 A | 6/1982 | Fukuchi et al. |

(Continued)

FOREIGN PATENT DOCUMENTS

| CN | 106064023 A | 11/2016 |
| CN | 106345466 B | 5/2020 |

(Continued)

OTHER PUBLICATIONS

Convective Heat Transfer Coefficients Table Chart—https://www.engineersedge.com/heat_transfer/convective_heat_transfer_coefficients_13378.htm—accessed Jun. 27, 2023 (Year: 2023).*

(Continued)

*Primary Examiner* — Bradley R Spies
(74) *Attorney, Agent, or Firm* — COOLEY LLP

(57) ABSTRACT

A system for processing a feed includes a membrane system configured to receive the feed and produce a concentrate and a permeate, wherein the membrane system includes an active cooling system, a passive cooling system, or a combination thereof. Further, the system includes a heat exchanger in fluid communication with the membrane system and disposed upstream of the membrane system, such that the feed enters the heat exchanger prior to entering the membrane system, wherein the heat exchanger is configured to cool the feed and heat the concentrate by transferring heat from the feed to the concentrate.

43 Claims, 10 Drawing Sheets

(56) References Cited

U.S. PATENT DOCUMENTS

| | | | |
|---|---|---|---|
| 4,767,422 A | 8/1988 | Bikson et al. | |
| 4,894,160 A | 1/1990 | Abe et al. | |
| 5,224,972 A | 7/1993 | Frye et al. | |
| 5,352,272 A | 10/1994 | Moll et al. | |
| 5,368,889 A | 11/1994 | Johnson et al. | |
| 5,538,536 A | 7/1996 | Fuentes et al. | |
| 5,762,685 A * | 6/1998 | Baker | B01D 53/002 95/50 |
| 5,888,272 A | 3/1999 | Prasad et al. | |
| 6,117,341 A | 9/2000 | Bray et al. | |
| 6,365,041 B1 * | 4/2002 | Hoadley | B01D 65/00 210/186 |
| 6,730,145 B1 | 5/2004 | Li | |
| 8,177,978 B2 | 5/2012 | Kurth et al. | |
| 8,231,013 B2 | 7/2012 | Chu et al. | |
| 8,361,321 B2 | 1/2013 | Stetson et al. | |
| 8,376,100 B2 | 2/2013 | Avadhany et al. | |
| 8,476,510 B2 | 7/2013 | Swager et al. | |
| 8,709,213 B2 | 4/2014 | Compton et al. | |
| 9,795,930 B2 | 10/2017 | Lai et al. | |
| 9,844,758 B2 | 12/2017 | Nair et al. | |
| 9,902,141 B2 | 2/2018 | Mi et al. | |
| 10,500,546 B2 | 12/2019 | Sinsabaugh et al. | |
| 10,653,824 B2 | 5/2020 | Bedworth et al. | |
| 10,974,208 B2 | 4/2021 | Dave et al. | |
| 11,097,227 B2 | 8/2021 | Frayne et al. | |
| 11,123,694 B2 | 9/2021 | Macleod et al. | |
| 11,465,398 B2 | 10/2022 | Mi et al. | |
| 11,498,034 B2 | 11/2022 | Frayne et al. | |
| 2002/0088748 A1 | 7/2002 | Allcock et al. | |
| 2003/0185741 A1 | 10/2003 | Matyjaszewski et al. | |
| 2004/0211726 A1 | 10/2004 | Baig et al. | |
| 2006/0201884 A1 | 9/2006 | Kulprathipanja et al. | |
| 2007/0017861 A1 | 1/2007 | Foley et al. | |
| 2008/0020197 A1 | 1/2008 | Ayers | |
| 2008/0149561 A1 | 6/2008 | Chu et al. | |
| 2009/0000651 A1 | 1/2009 | Qiao | |
| 2009/0120874 A1 | 5/2009 | Jensen et al. | |
| 2009/0155678 A1 | 6/2009 | Less et al. | |
| 2010/0194474 A1 | 8/2010 | Ishikawa et al. | |
| 2011/0056892 A1 | 3/2011 | Strauss et al. | |
| 2011/0108521 A1 | 5/2011 | Woo et al. | |
| 2011/0133134 A1 | 6/2011 | Varma et al. | |
| 2011/0139707 A1 | 6/2011 | Siwy et al. | |
| 2011/0186786 A1 | 8/2011 | Scheffer et al. | |
| 2011/0189452 A1 | 8/2011 | Lettow et al. | |
| 2011/0223494 A1 | 9/2011 | Feaver et al. | |
| 2012/0000845 A1 | 1/2012 | Park et al. | |
| 2012/0048804 A1 | 3/2012 | Stetson et al. | |
| 2012/0108418 A1 | 5/2012 | Nair et al. | |
| 2012/0152840 A1 * | 6/2012 | Fujita | B01D 71/028 210/640 |
| 2012/0171376 A1 | 7/2012 | Dodge | |
| 2012/0186980 A1 | 7/2012 | Ramaprabhu et al. | |
| 2012/0255899 A1 | 10/2012 | Choi et al. | |
| 2012/0295091 A1 | 11/2012 | Pasquali et al. | |
| 2013/0040283 A1 | 2/2013 | Star et al. | |
| 2013/0105417 A1 | 5/2013 | Stetson et al. | |
| 2013/0192460 A1 | 8/2013 | Miller et al. | |
| 2013/0270188 A1 | 10/2013 | Karnik et al. | |
| 2013/0305927 A1 | 11/2013 | Choi et al. | |
| 2013/0309776 A1 | 11/2013 | Drndic et al. | |
| 2013/0314844 A1 | 11/2013 | Chen et al. | |
| 2014/0030482 A1 | 1/2014 | Miller et al. | |
| 2014/0138314 A1 | 5/2014 | Liu et al. | |
| 2014/0199777 A2 | 7/2014 | Ruiz et al. | |
| 2014/0262820 A1 | 9/2014 | Kuan et al. | |
| 2014/0272286 A1 | 9/2014 | Stoltenberg et al. | |
| 2014/0311967 A1 | 10/2014 | Grossman et al. | |
| 2014/0332814 A1 | 11/2014 | Peng et al. | |
| 2014/0374267 A1 | 12/2014 | Monteiro et al. | |
| 2015/0010714 A1 | 1/2015 | Appleton et al. | |
| 2015/0122727 A1 | 5/2015 | Karnik et al. | |
| 2015/0224451 A1 | 8/2015 | Miyahara et al. | |
| 2015/0258506 A1 | 9/2015 | Mi et al. | |
| 2015/0273401 A1 | 10/2015 | Miller et al. | |
| 2015/0298115 A1 | 10/2015 | Campidelli et al. | |
| 2016/0009049 A1 | 1/2016 | Stoltenberg et al. | |
| 2016/0051942 A1 | 2/2016 | Park et al. | |
| 2016/0339160 A1 | 11/2016 | Bedworth et al. | |
| 2016/0354729 A1 | 12/2016 | Krishna et al. | |
| 2017/0021366 A1 | 1/2017 | Chapman et al. | |
| 2017/0154975 A1 | 6/2017 | Liu et al. | |
| 2017/0157570 A1 | 6/2017 | Chu et al. | |
| 2017/0298191 A1 | 10/2017 | Bullock et al. | |
| 2017/0341034 A1 | 11/2017 | Dave et al. | |
| 2017/0368508 A1 | 12/2017 | Grossman et al. | |
| 2018/0001267 A1 | 1/2018 | Lee et al. | |
| 2018/0071684 A1 | 3/2018 | Nair et al. | |
| 2018/0326362 A1 | 11/2018 | Niu et al. | |
| 2019/0224628 A1 | 7/2019 | Lin et al. | |
| 2019/0283388 A1 | 9/2019 | Mi et al. | |
| 2019/0314770 A1 | 10/2019 | Wang et al. | |
| 2020/0261861 A1 | 8/2020 | Zheng et al. | |
| 2020/0360868 A1 | 11/2020 | Macleod et al. | |
| 2020/0360869 A1 | 11/2020 | Frayne et al. | |
| 2020/0376442 A1 | 12/2020 | Zheng et al. | |
| 2021/0162336 A1 | 6/2021 | Terrien et al. | |
| 2021/0354094 A1 | 11/2021 | Frayne et al. | |
| 2021/0370242 A1 | 12/2021 | Macleod et al. | |

FOREIGN PATENT DOCUMENTS

| | | | |
|---|---|---|---|
| DE | 102010001504 A1 | 8/2011 | |
| EP | 2511002 A1 | 10/2012 | |
| KR | 20180000781 A | 1/2018 | |
| WO | WO-2010030382 A1 | 3/2010 | |
| WO | WO-2010043914 A2 | 4/2010 | |
| WO | WO-2010126686 A2 | 11/2010 | |
| WO | WO-2015075451 A1 | 5/2015 | |
| WO | WO-2016011124 A1 | 1/2016 | |
| WO | WO-2016189320 A1 | 12/2016 | |
| WO | WO-2017106540 A1 | 6/2017 | |
| WO | WO-2017197205 A1 | 11/2017 | |
| WO | WO-2017201482 A1 | 11/2017 | |
| WO | WO-2018067269 A1 | 4/2018 | |
| WO | WO-2018150690 A1 * | 8/2018 | ............ B01D 61/00 |
| WO | WO-2018160871 A2 | 9/2018 | |
| WO | WO-2019028280 A1 | 2/2019 | |
| WO | WO-2020232398 A1 | 11/2020 | |

OTHER PUBLICATIONS

Alen, Saif Khan, SungWoo Nam, and Seyed A. Dastgheib. "Recent advances in graphene oxide membranes for gas separation applications." International Journal of Molecular Sciences 20.22 (2019): 5609. (Year: 2019).*

Eryildiz, Bahriye, et al. "Flux-enhanced reduced graphene oxide (rGO)/PVDF nanofibrous membrane distillation membranes for the removal of boron from geothermal water." Separation and Purification Technology 274 (2021): 119058. (Year: 2021).*

Sevigny, Gary J., et al. Separation of tritiated water using graphene oxide membrane. No. PNNL-24411. Pacific Northwest National Lab.(PNNL), Richland, WA (United States), 2015. (Year: 2015).*

Abraham et al., "Tunable sieving of ions using graphene oxide membranes," Nature Nanotechnology, 12:546-550 (2017), including Methods, 1 page.

Aleman et al., "Transfer-Free Batch Fabrication of Large-Area Suspended Graphene Membranes," ACS NANO, 4(8):4762-4768 (2010).

Allen et al., "Honeycomb carbon: a review of graphene," Chem Rev., 110(1): 132-145 (2010); doi:10.1021/cr900070d.

An et al., "Separation performance of graphene oxide in aqueous solution," I&EC Research, 55:4803-4810 (2016).

Apel, Invited Talk. "Track etching technique in membrane technology," Radiational Measurements, 34:559-566 (2001).

Bagri et al., "Structural evolution during the reduction of chemically derived graphene oxide," Nat. Chem, 2:581-587 (2010).

Boukai et al., "Efficiency enhancement of copper contaminated radial p-n junction solar cells," Chem Phys Lett., 501:153-158 (2011).

(56) References Cited

OTHER PUBLICATIONS

Bourlinos et al., "Graphite oxide: Chemical reduction to graphite and surface modification with primary aliphatic amines and amno acids," Langmuir, 19(15):6050-6055 (2003).

Boutilier et al., "Implications of Permeation Through Intrinsic Defects in Graphene on the Design of Defect-Tolerant Membranes for Gas Separation," ACS Nano, 891:841-849 (2014).

Bowden, "A perspective on resist materials for fine line lithography," Materials for Microlithography, Advances in Chemistry Series, #266, American Chemical Society, Washington, D.C., 1984, Chapter 3:39-117.

Buffle et al., "Metal flux and dynamic speciation at (bio) interfaces. Part 1: Critical evaluation and compilation of physicochemical parameters for complexes with simple ligands and fulvic/humic substances," Environmental Science & Technology, 41(22):7609-7620 (2007).

Burress et al., "Graphene oxide framework materials: Theoretical predictions and experimental results," Ang Chem Intl Ed., 49(47):8902-8904 (2010).

Cath et al., "Forward osmosis: Principles, applications, and recent developments," Journal of Membrane Science, 281(1-2):70-87 (2006).

Chang et al., "Densely packed arrays of ultra-high-aspect-ratio silicon nanowires fabricated using block-copolymer lithography and metal-assisted etching," Adv Funct Mater., 19:2495-2500 (2009).

Choi et al., "Layer-by-Layer assembly of graphene oxide nanosheets on polyamide membranes for durable reverse-osmosis applications," ACS Appl. Mater. Interfaces, 5(23):12510-12519 (2013).

Chowdhury et al., "Fullerenic nanostructures in flames," J Mater Res., 11:341-347 (1996).

Chu, "Plugging up leaky graphene," MIT News Office, May 8, 2015, pp. 1-3; Available at http://news.mit.edu/2015/repair-graphene-leaks-0508.

Chung et al., "Emerging forward osmosis (fo) technologies and challenges ahead for clean water and clean energy applications," Current Opinion in Chemical Engineering, 1(3):246-257 (2012).

Cohen-Tanugi et al., "Mechanical strength of nanoporous graphene as a desalination membrane," Nano Lett., 14:6171-6178 (2014).

Cohen-Tanugi et al., "Quantifying the potential of ultra-permeable membranes for water desalination," Energy & Environmental Science, 7:1134-1141 (2014).

Cohen-Tanugi et al., "Water desalination across nanoporous graphene," Nano Lett., 12(7):3602-3608 (2012).

Dave, "Assessing Graphene Oxide for Water Desalination Applications," Ph.D. Thesis. Submitted to the Department of Mechanical Engineering, Massachusetts Institute of Technology, Jun. 2016, 134 pages.

Decher & Schmitt, "Fine-tuning of the film thickness of ultrathin multilayer films composed of consecutively alternating layers of anionic and cationic polyelectrolytes," In Trends in Colloid and Interface Science VI, Springer, 1992, pp. 160-164.

Decher, "Fuzzy nanoassemblies—toward layered polymeric multicomposites," Science, 277:1232-1237 (1997).

Deng et al., "Developments and new applications of UV-induced surface graft polymerizations," Progress in Polymer Science, 34(2):156-193 (2009).

Dikin et al., "Preparation and characterization of graphene oxide paper," Nature, 448(7152):457-460 (2007).

Dreyer et al., "The chemistry of graphene oxide," Chem Soc Rev, 39(1):228-240 (2010).

Du et al., "Separation of Hydrogen and Nitrogen Gases with Porous Graphene Membrane," J of Physical Chemistry, 115:23261-23266 (2011).

Dubas et al., "Polyelectrolyte multilayers containing a weak polyacid: construction and deconstruction," Macromolecules, 34(11):3736-3740 (2001).

Erickson et al., "Determination of the local chemical structure of graphene oxide and reduced graphene oxide," Adv Mater., 22:4467-4472 (2010).

Fang et al., "Constructing hierarchically structured interphases for strong and tough epoxy nanocomposites by amine-rich graphene surfaces," J Mater Chem., 20(43):9635-9643 (2010).

Fang et al., "Modification of polyethersulfone membrane by grafting bovine serum albumin on the surface of polyethersulfone/poly(acrylonitrile-co-acrylic acid) blended membrane," Journal of Membrane Science, 329:46-55 (2009).

Fang et al., "Pore size control of ultrathin silicon membranes by rapid thermal carbonization," Nano Lett., 10:3904-3908 (2010).

Fischbein et al., "Electron beam nanosculpting of suspended graphene sheets," Applied Physics Letters, 93:113107 (2008), 3 pages; https://doi.org/10.1063/1.2980518.

Georgakilas et al., "Functionalization of graphene: Covalent and non-covalent approaches, derivatives and applications," Chem Rev., 112(11):6156-6214 (2012). Epub Sep. 25, 2012.

Goel et al., "Size analysis of single fullerene molecules by electron microscopy," J Carbon, 42:1907-1915 (2004).

Grantab et al., "Anomalous strength characteristics of tilt grain boundaries in graphene," Science, 330(6006):946-948 (2010).

Hammond, "Recent explorations in electrostatic multilayer thin film assembly," Current Opinion in Colloid & Interface Science, 4(6):430-442 (1999).

Han et al., "Ultrathin graphene nanofiltration membrane for water purification," Advanced Function Materials, 23(29):3693-3700 (2013); doi:10.1002/ADFM.201202601.

Henis et al., "Composite hollow fiber membranes for gas separation: the resistance model approach," Journal of Membrane Science, 8:233-246 (1981).

Herrera-Alonso et al., "Intercalation and stitching of graphite oxide with diaminoalkanes," Langmuir, 23(21): 10644-10649 (2007). Epub Sep. 7, 2007.

Hu et al., "Enabling graphene oxide nanosheets as water separation membranes," Env Sci & Technol., 47(8):3715-3723 (2013). Epub Mar. 14, 2013.

Hu et al., "Graphene Oxide Membranes: Layer-by-layer Assembly via Electrostatic Interaction and Elucidation of Water and Solute Transport Mechanisms," Environmental Science & Technology, Univ. of Maryland, 2014, pp. 1-26.

Huang et al., "Graphene-based membranes for molecular separation," J Phys Chem Lett., 6(14):2806-2815 (2015). Epub Jun. 24, 2015.

Huang et al., "Ultrafast viscous water flow through nanostrand-channelled graphene oxide membranes," Nat Commun., 4:2979 (2013), 9 pages; doi: 10.1038/ncomms3979.

Hummers & Offerman, "Preparation of graphitic oxide," Journal of the American Chemical Society, 80(6):1339-1339 (1958).

Hung et al., "Cross-linking with diamine monomers to prepare composite graphene oxide-framework membranes with varying d-spacing," Chem Mater., 26(9):2983-2990 (2014).

Jia et al., "Dicarboxylic acids crosslinked graphene oxide membranes for salt solution permeation," Colloids Surf A: Physicochem Eng Aspects, 494:101-107 (2016). Epub Jan. 19, 2016.

Jia, Z. & Wang, Y., "Covalently crosslinked graphene oxide membranes by esterification reactions for ions separation," J. Mater. Chem. A, 3:4405-4412 (2015).

Jiang et al., "Porous Graphene as the Ultimate Membrane for Gas Separation," Nano Letters, 9(12):4019-4024 (2009).

Jin et al., "Use of polyelectrolyte layer-by-layer assemblies as nanofiltration and reverse osmosis membranes," Langmuir, 19(7):2550-2553 (2003).

Joshi et al., "Graphene oxide: The new membrane material," Appl Mater Today, 1(1):1-12 (2015).

Joshi et al., "Precise and ultrafast molecular sieving through graphene oxide membranes," Science, 343:752-754 (2014).

Kannam et al., "Interfacial slip friction at a fluid-solid cylindrical boundary," The Journal of Chemical Physics, 136(24):244704, 5 pages; doi:10.1063/1.4730167.

Karousis et al., "Graphene oxide with covalently linked porphyrin antennae: Synthesis, characterization and photophysical properties," J mater Chem., 21(1):107-117 (2011). Epub Oct. 4, 2010.

Kemell et al., "Transparent superhydrophobic surfaces by self-assembly of hydrophobic monolayers on nanostructured surfaces," Phys Stat Sol (a), 203:1453-1458 (2006).

(56) References Cited

OTHER PUBLICATIONS

Kim et al., "Applications of atomic layer deposition to nanofabrication and emerging nanodevices," Thin Solid Films, 517:2563-2580 (2009).

Kim et al., "Selective gas transport through few-layered graphene and graphene oxide membranes," Science, 342:91-94 (2013).

Kim et al., "Fabrication and Characterization of Large-Area, Semi-conducting Nanoperforated Graphene Materials," Nano Letters, 10:1125-1131 (2010); doi:10.1021/nl9032318.

Koenig et al., "Selective Molecular Sieving Through Porous Graphene," Nature Nano Technology, 7:728-732 (2012).

Kotov et al., "Ultrathin graphite oxide-polyelectrolyte composites prepared by self-assembly: Transition between conductive and non-conductive states," Advanced Materials, 8(8):637-641 (1996).

Kovtyukhova et al., "Layer-by-layer assembly of ultrathin composite films from micron-sized graphite oxide sheets and polycations," Chemistry of Materials, 11(3):771-778 (1999).

Krasemann et al., "Self-assembled polyelectrolyte multilayer membranes with highly improved pervaporation separation of ethanol/water mixtures," Journal of Membrane Science, 181(2):221-228 (2001).

Lee et al., "Measurement of the elastic properties and intrinsic strength of monolayer graphene," Science, 321(5887):385-388 (2008).

Lehtinen et al., "Effects of Ion Bombardment on a Two-Dimensional Target: Atomistic Simulations of Graphene Irradiation," Physical Review B, 81:153401.01-153401.04 (2010), 4 pages.

Lerf et al., "Hydration behavior and dynamics of water molecules in graphite oxide," J Phys Chem Sol., 67:1106-1110 (2006).

Li et al., "Processable aqueous dispersions of graphene nanosheets," Nature Nanotechnology, 3(2):101-105 (2008).

Li et al., "Ultrathin, molecular-sieving graphene oxide membranes for selective hydrogen separation," Science, 342:95-98 (2013).

Li, Y. et al., "Mild annealing reduced graphene oxide membrane for nanofiltration," Journal of Membrane Science, 601:117900, 7 pages; doi.org/10.1016/j.memsci.2020.117900.

Liu et al., "Graphene facilitated visible light photodegradation of methylene blue over titanium dioxide photocatalysts," Chem Eng J, 214:298-303 (2013).

Liu et al., "Two-Dimensional-Material Membranes: A New Family of High-Performance Separation Membranes," Angew Chem Int Ed Engl., 55(43):13384-13397 (2016); doi:10.1002/anie.201600438. Epub Jul. 1, 2016.

Malaisamy et al., "High-flux nanofiltration membranes prepared by adsorption of multilayer polyelectrolyte membranes on polymeric supports," Langmuir, 21:10587-10592 (2005).

Marcano et al., "Improved synthesis of graphene oxide," ACS Nano, 4(8):4806-4814 (2010).

Mattevi et al., "Evolution of electrical, chemical, and structural properties of transparent and conducting chemically derived graphene thin films," Adv Funct mater., 19(16):2577-2583 (2009).

McGinnis et al., "Global challenges in energy and water supply: The promise of engineered osmosis," Environmental Science & Technology, 42(23):8625-8629 (2008).

Mi et al., "Organic fouling of forward osmosis membranes: Fouling reversibility and cleaning without chemical reagents," Journal of Membrane Science, 348(1-2):337-345 (2010).

Mi, "Graphene Oxide Membranes for Ionic and Molecular Sieving," Science, 343:740-742 (2014).

Miller et al., "Mutual diffusion coefficients and ionic transport coefficients lij of magnesium chloride-water at 25degree C.," The Journal of Physical Chemistry, 88(23):5739-5748 (1984).

Miller et al., "Ring-closing metathesis as a new methodology for the synthesis of monomeric flavonoids and neoflavonoids," Tetrahedron Lett., 53(35):4708-4710 (2012). Epub Jun. 28, 2012.

Min et al., "Mechanical properties of graphene under shear deformation," Applied Physics Letters, 98(1):013113 (2011), 3 pages; https://doi.org/10.1063/1.3534787.

Mohan et al., "Graphene-based materials and their composites: A review on production, applications and product limitations," Composites Part B: Engineering, 142:200-220 (2018).

Mooney et al., "Simulation studies for liquid phenol: properties evaluated and tested over a range of temperatures," Chem Phys Lett., 294:135-142 (1998).

Nair et al., "Unimpeded permeation of water through helium-leak-tight graphene-based membranes," Science, 335(6067):442-444 (2012).

Nan, Q. et al., "Fabrication of positively charged nanofiltration membrane via the layer-by-layer assembly of graphene oxide and polyethylenimine for desalination," Appiled Surface Science, 387:521-528 (2016).

Nyyssonen, "Optical linewidth measurement on patterned wafers," SPIE Proceedings, Integrated Circuit Metrology, 480:65, 7 pages (1984).

O'Hern et al., "Selective molecular transport through intrinsic defects in a single layer of CVD graphene," ACS Nano, 6(11):10130-10138 (2012).

Okazoe et al., "Alkylidenation of ester carbonyl groups by means of a reagent derived from RCHBr2, Zn, TiCl4, and TMEDA. Stereoselective preparation of (Z)-alkenyl ethers," J Org Chem., 52(19):4410-4412 (1987).

Ouyang et al., "Multilayer polyelectrolyte films as nanofiltration membranes for separating monovalent and divalent cations," Journal of Membrane Science, 310(1-2):76-84 (2008).

Park et al., "Covalent functionalization of graphene with reactive intermediates," Accts of Chem Research, 46(1):181-189 (2013). Epub Nov. 1, 2012.

Pendergast et al., "A review of water treatment membrane nanotechnologies," Energy Environ Sci., 4:1946-1971 (2011).

Perrault et al., "Thin-Film Composite Polyamide Membranes Functionalized with Biocidal Graphene Oxide Nanosheets," Environ. Sci. Technol. Lett., 1(1):71-76 (2014).

Perry et al., "Reliable, bench-top measurements of charge density in the active layers of thin-film composite and nanocomposite membranes using quartz crystal microbalance technology," Journal of Membrane Science, 429:23-33 (2013).

Pine et al., "Ketone methylenation using the Tebbe and Wittig reagents—A comparison," Synthesis, 1991(2):165-167 (1991).

Prabhu et al., "SEM-induced shrinking of solid-state nanopores for single molecule detection," Nanotech., 22:425302-425311 (2011).

Qiu et al., "Controllable corrugation of chemically converted graphene sheets in water and potential application for nanofiltration," Chem Commun, 47(20):5810-5812 (2011).

Qiu et al., "Synthesis of high flux forward osmosis membranes by chemically crosslinked layer-by-layer polyelectrolytes," Journal of Membrane Science, 381(1-2):74-80 (2011).

Russo et al., "Atom-By-Atom Nucleation And Growth of Graphene Nanopores," PNAS, 109(16):5953-5957 (2012).

Saren et al., "Synthesis and characterization of novel forward osmosis membranes based on layer-by-layer assembly," Environmental Science & Technology, 45(12):5201-5208 (2011).

Schrier, "Carbon dioxide separation with a two-dimensional polymer membrane," ACS Appl Mater Interfaces, 4*7):3745-3752 (2012).

Shen et al., "Covalent synthesis of organophilic chemically functionalized graphene sheets," Journal of Colloid and Interface Science, 348(2):377-383 (2010).

Shiratori et al., "Ph-dependent thickness behavior of sequentially adsorbed layers of weak polyelectrolytes," Macromolecules, 33(11):4213-4219 (2000).

Singh et al., "Modification of regenerated cellulose ultrafiltration membranes by surface-initiated atom transfer radical polymerization," Journal of Membrane Science, 311:225-234 (2008).

Sint et al., "Selective ion passage through functionalized graphene nanopores," J am Chem Soc., 130(49):16448-16449 (2008).

Srinivas et al., "Porous graphene oxide frameworks: Synthesis and gas sorption properties," 21(30):11323-11329 (2011). Epub Jun. 23, 2011.

Stanton et al., "Ultrathin, multilayered polyelectrolyte films as nanofiltration membranes," Langmuir, 19(17):7038-7042 (2003).

Storm et al., "Fabrication of solid-state nanopores with single-nanometre precision," Nat Mater Lett., 2:537-540 (2003), including Supplementary Information, 1 page.

Suess, "Abundances of the elements," Reviews of Modern Physics, 18:53-74 (1956).

(56) References Cited

OTHER PUBLICATIONS

Suk et al., "Molecular and continuum hydrodynamics in graphene nanopores," RSC Adv., 3:9365-9372 (2013).
Suk et al., "Water transport through ultrathin graphene," J. Phys. Chem. Lett., 1:1590-1594 (2010).
Sun et al., Selective ion penetration of graphene oxide membranes, ACS Nano., 7(1):428-437 (2013).
Sun et al., "Laminar MoS2 membranes for molecule separation," Chem Commun., 49(91):10718-10720 (2013).
Surwade et al., "Water desalination using nanoporous single-layer graphene," Nat Nanotechnol., 23:1-6 (2015).
Sydlik, S. A. & Swager, T. M., "Functional Graphenic Materials Via a Johnson-Claisen Rearrangement," Adv. Funct. Mater., 23:1873-1882 (2013).
Szabo et al., "Evolution of surface functional groups in a series of progressively oxidized graphite oxides," Chemistry of Materials, 18(11):2740-2749 (2006).
Taffa et al., "Pore size and surface charge control in mesoporous TiO2 using post-grafted SAMs," Phys Chem Chem Phys., 12:1473-1482 (2010).
Tiraferri et al., "Relating performance of thin-film composite forward osmosis membranes to support layer formation and structure," Journal of Membrane Science, 367(1-2):340-352 (2011).
Ulman, A., "Formation and Structure of Self-Assembled Monolayers," Chem. Rev., 96(4):1533-1554 (1996).
Van Den Haut et al., Controlling nanopore size, shape and stability, Nanotech., 21:115304-115309 (2010).
Wang et al., "Characterization of novel forward osmosis hollow fiber membranes," Journal of Membrane Science, 355(1):158-167 (2010).
Xia et al., "Ultrathin graphene oxide nanosheet membranes with various d-spacing using the pressure-assisted filtration method for removing natural organic matter," Desalination, 371:78-87 (2015). Epub Jun. 11, 2015.
Yeh et al., "On the origin of the stability of graphene oxide membranes in water," Nat Chem., 7(2):166-170 (2015). Epub Jan. 5, 2015.
Yip et al., "High performance thin-film composite forward osmosis membrane," Environmental Science & Technology, 44(10):3812-3818 (2010).
Yip et al., "Thin-film composite pressure retarded osmosis membranes for sustainable power generation from salinity gradients," Environmental Science & Technology, 45(10):4360-4369 (2011).
Yoon et al., "Graphene-based membranes: status and prospects," Phil. Trans. R. Soc. A, 374: 20150024 (2016), 23 pages; doi:10.1098/rsta.2015.0024.
Zangmeister et al., "Restructuring of graphene oxide sheets into monodisperse nanospheres," Chemistry of Materials, 24(13):2554-2557 (2012).
Zhang et al., "Self-assembly of polyelectrolyte multilayer pervaporation membranes by a dynamic layer-by-layer technique on a hydrolyzed polyacrylonitrile ultrafiltration membrane," Journal of Membrane Science, 292(1-2):1-8 (2007).
Zhao et al., "Recent developments in forward osmosis: Opportunities and challenges," Journal of Membrane Science, 396(0):1-21 (2012).
Zhou et al., "Surface modification of thin film composite polyamide membranes by electrostatic self deposition of polycations for improved fouling resistance," Separation and Purification Technology, 66(2):287-294 (2009).
Zhu et al., "Surface modification of PVDF porous membranes via poly(DOPA) coating and heparin immobilization," Colloids Surf B Biointerfaces, 69(1):152-155 (2009); doi:10.1016/j.colsurfb.2008.11.011. Epub Nov. 25, 2008.

\* cited by examiner

TABLE T1

| Heat Exchanger Integration Overview Table | | |
|---|---|---|
| Parameter | Value | Unit |
| Feed Flow | 346 | GPM |
| Concentrate Flow | 226 | GPM |
| Feed Temp IN | 90 | °C |
| Feed Temp OUT | 70 | °C |
| Concentrate Temp IN | 54 | °C |
| Concentrate Temp OUT | 85 | °C |
| Heat Transferred | 6.9 | MBTU/hr |

TABLE T2

| System Heat Loss Overview Table | | |
|---|---|---|
| Parameter | Value | Unit |
| Feed Flow IN | 191 | GPM |
| Concentrate Flow OUT | 125 | GPM |
| Feed Temp IN | 70 | °C |
| Concentrate Temp OUT | 54 | °C |
| Heat Transferred | 5.4 | MBTU/hr |
| Area Required | 25,200 | ft^2 |
| Vessel Contribution | 7,900 | ft^2 |
| Remaining EQ.L 4" Pipe | 16,600 | ft |

*FIG. 12*

HEAT EXCHANGER INTEGRATION WITH MEMBRANE SYSTEM FOR EVAPORATOR PRE-CONCENTRATION

CROSS REFERENCE TO RELATED APPLICATIONS

This application is a continuation of International Patent Application No. PCT/US2022/080120, entitled "Heat Exchanger Integration with Membrane System for Evaporator Pre-concentration," filed Nov. 18, 2022, which claims priority to and the benefit of U.S. Provisional Patent Application No. 63/283,767, entitled "Heat Exchanger Integration with Membrane System for Evaporator Pre-concentration," filed Nov. 29, 2021, the disclosure of each of which is hereby incorporated by reference in its entirety.

TECHNICAL FIELD

The present disclosure generally relates to systems, apparatuses, and methods for combining heat exchangers and membranes.

BACKGROUND

Various membranes (e.g., polymer membranes or graphene oxide membranes) have been used for water softening, desalination, and for the concentration, removal, and purification of different salts, small molecules, and macromolecules. However, at high temperatures, the membranes can become damaged, thereby reducing their operating life and separation performance.

In addition, membranes are used to pre-concentrate feed streams (referred to as a concentrate) to evaporators. Evaporators (and other high-temperature processes such as reactors and distillation columns) typically operate best with high feed temperatures, whereas membrane separation systems typically perform better at lower temperatures. As such, energy needs to be expended to heat the concentrate before it is fed to evaporators.

Accordingly, there is a need in the art of filtering systems for cooling a feed, as well as for heating a concentrate produced by a membrane in an environmentally friendly manner.

SUMMARY

Consistent with a disclosed embodiment, a system for processing a feed is provided. The system includes a membrane system configured to receive the feed and produce a concentrate and a permeate, wherein the membrane system includes an active cooling system, a passive cooling system, or a combination thereof. Further, the system includes a heat exchanger in fluid communication with the membrane system and disposed upstream of the membrane system, such that the feed enters the heat exchanger prior to entering the membrane system, wherein the heat exchanger is configured to cool the feed and heat the concentrate by transferring heat from the feed to the concentrate.

In some implementations, the feed comprises a liquid.

In some implementations, the heat exchanger operates at about atmospheric pressure.

In some implementations, the heat exchanger is configured to transfer about 0.24 to about 0.39 BTU/gallon from the feed to the concentrate.

In some implementations, the heat exchanger is configured to have a heat transfer coefficient in a range of about 100 to about 500 BTU per hour-square feet-Fahrenheit.

In some implementations, the heat exchanger is configured to have about 900 to about 1,000 square feet of effective heat transfer area.

In some implementations, the passive cooling system includes uninsulated piping, a membrane housing, or a combination thereof.

In some implementations, the active cooling system includes at least one of a water sprayer, a heat sink with cooling fins, or a membrane system heat exchanger.

In some implementations, the membrane system includes both the active cooling system and the passive cooling system. Additionally, in some implementations the system further includes a controller configured to determine performance of the passive cooling system and adjust an operation of the active cooling system based on the determined performance of the passive cooling system, such that the cooling of the membrane system is at a target cooling level.

Further, in some implementations, the controller is further configured to control an operation of the heat exchanger to control a temperature of the feed based on the determined performance of the passive cooling.

In some implementations, the system further includes a controller configured to determine a temperature of the concentrate before the concentrate enters the heat exchanger or after the concentrate leaves the heat exchanger and adjust a heat transfer rate between the feed and the concentrate based on the determined temperature of the concentrate.

Further, in some implementations, adjusting the heat transfer rate includes reducing or increasing an effective heat transfer area of the heat exchanger.

Further, in some implementations, adjusting the heat transfer rate includes separating a flow of the feed into a first flow and a second flow, wherein the first flow is configured to pass through the heat exchanger, the second flow is configured to bypass the heat exchanger, and the controller is configured to determine a magnitude of the first flow and/or second flow. Further, adjusting the heat transfer rate includes recombining the first and the second flow after the first flow passes through the heat exchanger.

In some implementations, the system further includes a controller configured to determine a temperature of a membrane in the membrane system and adjust a heat transfer rate between the feed and the concentrate based on the determined temperature of the membrane.

Further, in some implementations, the controller is configured to increase a temperature of the feed if the membrane temperature is below a target temperature value and decrease the temperature of the feed if the membrane temperature is above the target temperature value.

In some implementations, a temperature difference between the concentrate prior to entering the heat exchanger and the feed prior to entering the heat exchanger is between about 10-40 degrees Celsius.

In some implementations, the system includes a controller configured to determine a temperature ($T_c$) of the concentrate, determine a temperature ($T_f$) of the feed, and adjust a heat transfer rate between the feed and the concentrate based on the determined $T_c$ and $T_f$ to minimize a system objective function F.

Further, in some implementations, the system objective function F is $F = w_1(T_c - T_{c\ ref})^2 + w_2(T_f - T_{f\ ref})^2$, wherein $T_{c\ ref}$ is a concentrate reference temperature, and $T_{f\ ref}$ is a feed reference temperature, and $w_1$ and $w_2$ are weights ranging between zero and one.

In some implementations, the system includes a controller configured to determine a change in a flow rate of the feed and adjust a heat transfer rate in the heat exchanger based on the determined change in the flow rate of the feed.

In some implementations, the membrane system includes both the active cooling and the passive cooling. In some implementations, the system further includes a controller configured to determine a change in a flow rate of the feed, adjust a heat transfer rate in the heat exchanger based on the determined change in the flow rate of the feed, and adjust an operation of the active cooling system based on the determined change in the flow rate of the feed.

In some implementations, the membrane system comprises a graphene oxide membrane.

In some implementations, the feed enters the heat exchanger at a flow rate of about 165 to about 220 klb/hr.

In some implementations, the concentrate enters the heat exchanger at a flow rate of about 110 to about 165 klb/hr.

Consistent with another disclosed embodiment, a system for processing a feed is provided. The system includes a membrane system configured to receive the feed and produce a concentrate and a permeate, the membrane system including an active cooling system, a passive cooling system, or a combination thereof. Further, the system includes a first heat exchanger in fluid communication with the membrane system and disposed upstream of the membrane system and a second heat exchanger in fluid communication with both the first heat exchanger and the membrane system. The second heat exchanger is disposed between the first heat exchanger and the membrane system, such that the feed enters the first heat exchanger, the second heat exchanger, and the membrane system sequentially. Further, the first heat exchanger is configured to cool the feed and heat the concentrate by transferring heat from the feed to the concentrate, and the second heat exchanger is configured to cool the feed and heat the permeate by transferring heat from the feed to the permeate.

In some implementations, a temperature difference between the concentrate prior to entering the first heat exchanger and the feed prior to entering the first heat exchanger is between about 10-40 degrees.

Further, in some implementations, a difference in temperature between the concentrate prior to entering the first heat exchanger and the permeate prior to entering the second heat exchanger is between about 0-15 degrees Celsius.

In some implementations, the system also includes a controller configured to determine a temperature of a membrane in the membrane system, adjust a heat transfer rate in the first heat exchanger based on the determined temperature of the membrane, and adjust a heat transfer rate in the second heat exchanger based on the determined temperature of the membrane.

In some implementations, the system includes a controller configured to determine a temperature of the concentrate before the concentrate enters the heat exchanger or after the concentrate leaves the heat exchanger, determine a temperature of a membrane in the membrane system, adjust a heat transfer rate in the first heat exchanger based on the determined temperature of the concentrate, and adjust a heat transfer rate in the second heat exchanger based on the determined temperature of the membrane.

In some implementations, the system includes a controller configured to determine a change in a flow rate of the feed and adjust a heat transfer rate in the first heat exchanger or the second heat exchanger based on the determined change in the flow rate of the feed.

Further, in some implementations, the membrane system comprises a graphene oxide membrane.

In some implementations, the system includes a controller configured to determine a temperature ($T_c$) of the concentrate, determine a temperature ($T_f$) of the feed, determine a temperature ($T_p$) of the permeate, and adjust a heat flow between the feed and the concentrate and between the feed and the permeate based on the determined $T_c$, $T_f$, and $T_p$ to minimize a system objective function F.

Further, in some implementations, the system objective function F is $F=w_1 (T_c-T_{c\,ref})^2+w_2 (T_f-T_{f\,ref})^2$, wherein $T_{c\,ref}$ is a concentrate reference temperature, and $T_{f\,ref}$ is a feed reference temperature, and $w_1$ and $w_2$ are weights ranging between zero and one.

Further, in some implementations, the system objective function F is $F=w_1 (T_c-T_{c\,ref})+w_2(T_f-T_{f\,ref})+w_3(T_p-T_{p\,ref}))$ wherein $T_{c\,ref}$ is a concentrate reference temperature, $T_{f\,ref}$ is a feed reference temperature, and $T_{p\,ref}$ is a permeate reference temperature, and $w_1$, $w_2$, and $w_3$ are weights ranging between zero and one.

The foregoing general description and the following detailed description are exemplary and explanatory only and are not restrictive of the claims.

BRIEF DESCRIPTION OF THE DRAWINGS

FIG. 12 are tables depicting possible parameters for processing a feed using the systems of the present disclosure, according to an embodiment.

DETAILED DESCRIPTION

Figure 1:
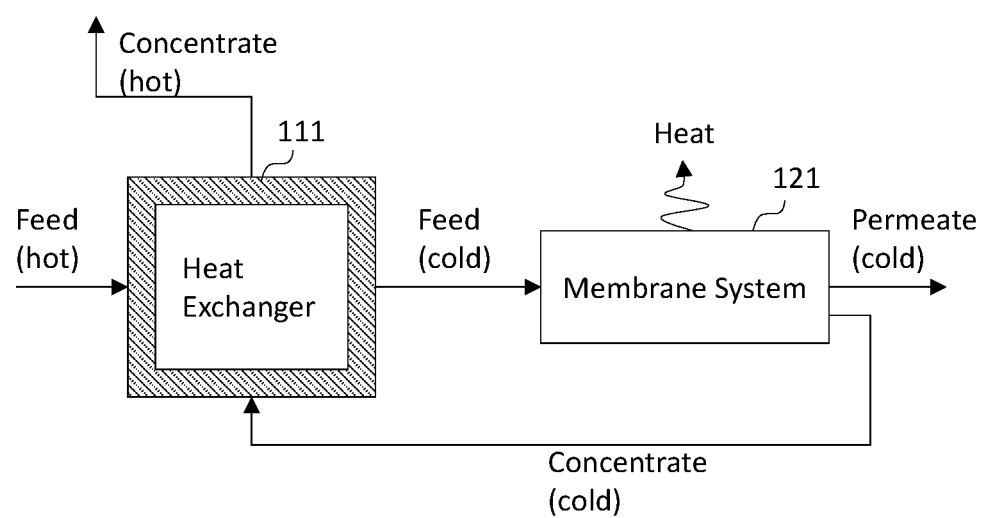
FIG. 1 is an example system for processing a feed, according to an embodiment.

Aspects of the present disclosure are related to systems and methods for concentrating a feed stream (herein simply referred to as a feed) prior to the feed entering an evaporator, thus, making the evaporation process more energy efficient. Evaporators (and other high temperature processes such as reactors and distillation columns) typically operate better with high feed temperatures, whereas membrane separation systems typically perform better at lower temperatures. Besides membrane system, there are other systems, which may also benefit from the feed being at a lower temperature. Such systems may include system for precipitation, phase separations, skimming, chromatography, extraction, absorption, and the like.

An example process that involves a membrane system is the process of obtaining a concentrated solution (e.g., a concentrated black liquor). Such a process may occur intermediate or before high temperature evaporation. The separation of water from black liquor using membrane systems may be performed at a lower temperature (e.g., various membrane systems may benefit from operating at temperatures that are lower than temperatures used for evaporation), however, frequently, such separation is performed at a high temperature because of the requirements of other processes (e.g., evaporation). Using approaches described in this disclosure, a concentrated feed can be produced by the membrane systems to further reduce water content in the black liquor, with the concentrated feed obtained at temperatures lower than what is currently used in the technology. In some cases, after the process using the membrane systems, tall oil or soap can be removed from the concentrated black liquor before it is reheated.

To address the fact that different systems (e.g., evaporators, distillers, membrane systems, and the like) require different operational temperatures, the present disclosure describes various embodiments of a system that improves heat management for: (a) reducing energy waste; and (b) increasing the operating life and separation performance of membrane systems.

It should be also noted, that for a membrane system, the disclosed embodiments describe transferring heat from the feed to a concentrate and/or to a permeate produced by the membrane system. Since the concentrate and the permeate are always a fraction of the feed flow, the temperature rise of the concentrate or the permeate is typically higher than the temperature change of the feed being cooled during the heat transfer from feed to the concentrate (and/or the permeate). Thus, the concentrate (and/or permeate) can be heated close to a target temperature value despite large amounts of passive or active cooling of the membrane system.

In some cases, a membrane system cannot operate at the temperature of the feed or the required temperature of the concentrate (or permeate). By integrating a heat exchanger, passive cooling, and/or active cooling, the membrane system can operate at twenty, thirty, or more degree Celsius below the required temperatures of the other operations.

Aspects of the present disclosure are related to a system 100 for processing a feed and producing a concentrate, each of which at a desirable temperature or temperature range, as shown in FIG. 1. The system 100 includes a heat exchanger 111 and a membrane system 121. In some implementations, other than coupling elements (e.g., pipes or channels) that connect the heat exchanger 111 and the membrane system 121, there are no additional devices between the heat exchanger 111 and the membrane system 121.

The heat exchanger 111 is in fluid communication with the membrane system 121 and disposed upstream of the membrane system 121, such that the feed enters the heat exchanger 111 to be cooled prior to entering the membrane system 121. The heat exchanger 111 may be any suitable heat exchanger configured to cool the feed and heat the concentrate by transferring heat from the feed to the concentrate. In an example implementation, as shown in FIG. 1, the cold concentrate from the membrane system 121 is heated in the heat exchanger 111 while the feed is cooled by dissipating the heat towards the concentrate. In an example implementation, the heat exchanger 111 is a convection/conduction heat exchanger (e.g., the heat exchanger 111 utilizes the transfer of thermal energy from a surface by way of the motion of a cold concentrate relative to the surface of an enclosure containing a hot feed). Herein, the term "hot" indicates that the feed is at a higher temperature than the cold concentrate. During the heat exchange, the concentrate may be heated by about a few tens of degrees. In an example embodiment, the concentrate may be heated by at least about 10 degrees Celsius (10° C.) and by no more than about 40° C. Further, the feed may be cooled by about a few degrees to a few tens of degrees. For example, the feed may be cooled by at least about 5° C. and by no more than about 30° C.

In some implementations, in addition to using the cold concentrate, or alternatively to using a cold concentrate to cool the feed, a different liquid may be utilized. For example, a chilled fluid (e.g., chilled water or antifreeze) may be utilized additionally (or alternatively) to cool the feed. In some cases, a first piping system of the heat exchanger 111 may be used to cool the feed using the cold concentrate, and a second piping system of the heat exchanger 111 may be used to cool the feed using a chilled fluid. Additionally, besides using the concentrate or the chilled fluid as cooling agents, the heat exchanger 111 may also use other approaches for cooling the feed (e.g., thermoelectric cooling, refrigeration system, or the like).

In some implementations, the heat exchanger 111 may include passive cooling elements in addition to active cooling elements that utilize cold concentrate and chilled fluids. For example, the heat exchanger 111 may include suitable heatsinks, and the like. In some implementations, the heat exchanger 111 includes heat pipes, fans, or any other devices for promoting the removal of heat from the feed. In various implementations, the heat exchanger 111 may be exposed to an ambient environment (e.g., to outside air) and operate and at about atmospheric pressure.

In an example implementation, the heat exchanger 111 may transfer any suitable amount of heat from the feed to the concentrate. For example, the heat exchanger 111 may be configured to transfer at least about 0.14 BTU/gallon, about least about 0.19 BTU/gallon, at least about 0.24 BTU/gallon, at least about 0.29 BTU/gallon, at least about 0.34 BTU/gallon, about least about 0.39 BTU/gallon, at least about 0.44 BTU/gallon, or at least about 0.49 BTU/gallon from the feed to the concentrate. The heat exchanger 111 may be configured to transfer no more than about 0.72 BTU/gallon, no more than about 0.67 BTU/gallon, no more than about 0.62 BTU/gallon, no more than about 0.57 BTU/gallon, no more than about 0.52 BTU/gallon, no more than about 0.49 BTU/gallon, no more than about 0.44 BTU/gallon, or no more than about 0.39 BTU/gallon from the feed to the concentrate.

Combinations of the above-referenced ranges for the rate of heat transfer are also contemplated. For example, in certain implementations, the heat exchanger 111 may be configured to transfer about 0.14 to about 0.72 BTU/gallon or about 0.24 to about 0.39 BTU/gallon from the feed to the concentrate, inclusive of all values and ranges therebetween.

In some implementations, the heat exchanger 111 is configured to have a heat transfer coefficient of at least about 60 BTU per hour-square feet-Fahrenheit, at least about 70 BTU per hour-square feet-Fahrenheit, at least about 80 BTU per hour-square feet-Fahrenheit, at least about 90 BTU per hour-square feet-Fahrenheit, at least about 100 BTU per hour-square feet-Fahrenheit, at least about 110 BTU per hour-square feet-Fahrenheit, or at least about 120 BTU per hour-square feet-Fahrenheit. In some implementations, the heat exchanger 111 is configured to have a heat transfer coefficient of no more than about 800 BTU per hour-square feet-Fahrenheit, not more than about 750 BTU per hour-square feet-Fahrenheit, no more than about 700 BTU per hour-square feet-Fahrenheit, no more than about 700 BTU per hour-square feet-Fahrenheit, no more than about 650 BTU per hour-square feet-Fahrenheit, no more than about 600 BTU per hour-square feet-Fahrenheit, no more than about 550 BTU per hour-square feet-Fahrenheit, or no more than about 500 BTU per hour-square feet-Fahrenheit.

Combinations of the above-referenced ranges for the heat transfer coefficient of the heat exchanger 111 are also contemplated. For example, in certain implementations, the heat transfer coefficient of the heat exchanger 111 is in a range of about 60 to about 800 BTU per hour-square feet-Fahrenheit or about 100 to about 500 BTU per hour-square feet-Fahrenheit, inclusive of all values and ranges therebetween.

The heat exchanger 111 includes a heat transfer area over which the concentrate and the feed can interact. For example, the heat transfer area may be a heat-conducting surface of an enclosure such that the feed is located on one side of the surface and the concentrate is located on another side of the surface. In an example implementation, the enclosure may include a set of pipes, a set of channels (e.g., ducts), and the like. The heat transfer area for the heat exchanger 111 may be a few hundred of feet squared or as much as a thousand feet squared. In some cases, heat transfer area may be in a range of 500-5000 feet squared.

In some implementations, the heat exchanger 111 is configured to have a heat transfer area of at least about 500 feet squared, at least about 700 feet squared, at least about 900 feet squared, at least about 1200 feet squared, or at least about 1400 feet squared. In some implementations, the heat exchanger 111 is configured to have the heat transfer area of no more than about 1000 feet squared, no more than about 2000 feet squared, no more than about 3000 feet squared, no more than about 4000 feet squared, or no more than about 5000 feet squared.

The membrane system 121 is configured to receive the feed and produce a concentrate and a permeate. The membrane system 121 may be any suitable system for filtering the feed. For example, the membrane system 121 may include a membrane (e.g., a graphene oxide membrane formed from multiple graphene oxide sheets, a polymeric membrane, or a composite membrane) that is supported by a support substrate. In an example embodiment, a combination of different types of membranes may be used. For example, a graphene oxide membrane may be used first, and a polyamide membrane can follow the graphene oxide membrane and further filter the permeate after the permeate is sufficiently cooled. Because sufficiently high temperatures (e.g., above 75° C.) can cause damage to membranes (e.g., the sufficiently high temperatures can cause pore dilation, loss of rejection, hydrolysis, glue line failure, increased intrusion, loss of flux, and the like), the membrane system 121 is configured to have a cooling system. In an example embodiment, graphene oxide membrane may be configured to operate in a temperature range of 60°-75° C., including all the temperature values in between. In some cases, temperatures of 70°-80° C. may be used to integrate with pulp production. In some implementations of the membrane system 121, membrane temperatures in a range of 35°-40° C. may be used, including all the temperature values in between. For example, the membrane system 121 operating at lower temperatures (e.g., temperatures in the range of 35°-40° C.) may be well suited for reverse osmosis (RO) systems. In some implementations of the membrane system 121, temperatures of 40°-60° C. degrees may be used, including all the temperature values in between. Example graphene oxide membranes are disclosed in U.S. Pat. Nos. 11,123,694 and 11,097,227, each of which is incorporated herein by reference and attached hereto as Exhibits A and B, respectively.

In an example implementation, the membrane system 121 includes a passive cooling system. For example, the passive cooling system may include uninsulated piping, a membrane housing, or a combination thereof. In some cases, the passive cooling system includes suitable heatsinks configured to conduct heat away from the membrane. The heatsinks may be formed from any suitable metal (e.g., copper, aluminum, steel, and the like). In some cases, the heatsinks may include fins configured to dissipate heat into surrounding ambient air.

Additionally, or alternatively, the membrane system 121 includes an active cooling system. The active cooling system may include fans for improving heat dissipation from the fins of one or more heatsinks. Additionally, or alternatively, the active cooling system includes a water sprayer for spraying water over parts of the membrane system 121 (e.g., for spraying water over a heatsink of the membrane system 121). In some implementations, the active cooling system may include a heat exchanger configure to transfer heat to a cooled water stream. Further, the active cooling system may include a suitable membrane system heat exchanger.

As shown in FIG. 1, the heat is extracted from the membrane system 121, and the membrane system 121 produces a concentrate and permeate at a temperature lower than the temperature of the incoming feed. Such a concentrate and permeate are referred to as a "cold" concentrate or permeate. In an example embodiment, the temperature of the concentrate prior to entering the heat exchanger 111 may be about 10-40 degrees lower than the temperature of the feed prior to entering the heat exchanger 111 (e.g., the temperature of the concentrate may be in a range of 40° to 70° C., including all the temperature values in between, while the temperature of the feed prior to entering the heat exchanger 111 may be between 85° and 95° C., including all the temperature values and ranges in between). The temperature of the permeate exiting the membrane system 121 may be about the same as the temperature of the concentrate (e.g., in a range of 40° to 70° C.), including all the temperature values in between. In the embodiment shown in FIG. 1, the feed, the concentrate, and the permeate are fluids. In an example implementation, the feed, the concentrate, and the permeate are liquids.

Figure 2:
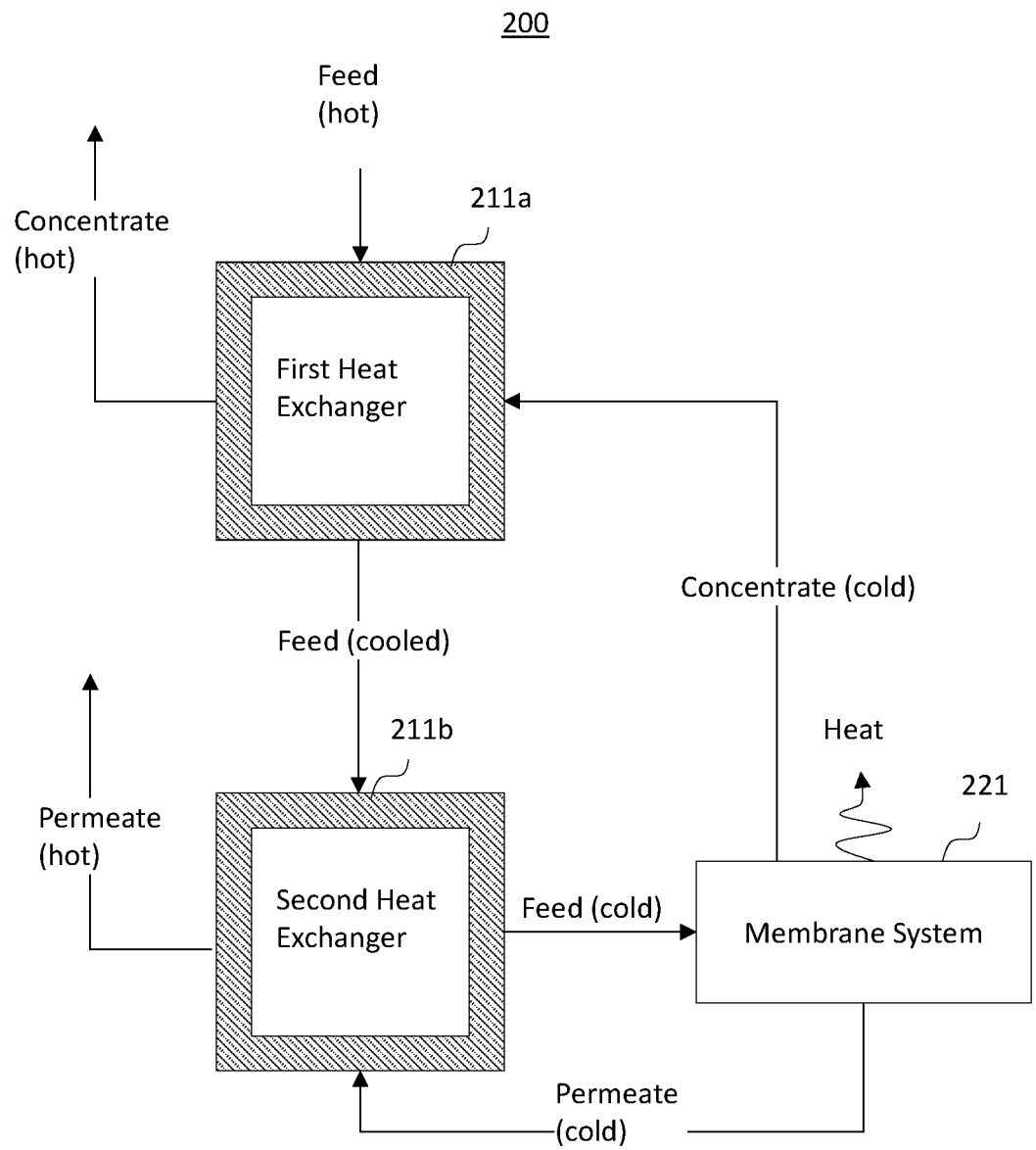
FIG. 2 is another example system for processing a feed, according to an embodiment.

FIG. 2 shows another embodiment of a system 200, which is similar to the system 100. The system 200 includes a first heat exchanger 211a, a second heat exchanger 211b, and a membrane system 221. The second heat exchanger 211b is in fluid communication with both the first heat exchanger 211a and the membrane system 221 and disposed between the first heat exchanger 211a and the membrane system 221. As shown in FIG. 2, the feed first enters the first heat exchanger 211a, then proceeds to the second heat exchanger 211b, and after exiting the second heat exchanger 211b, further proceeds to the membrane system 221.

Similar to the system 100, the cold concentrate from the membrane system 221 is configured to exchange heat with the feed using the first heat exchanger 211a. Further, the cold permeate is configured to exit the membrane system 221 and be used as a cooling agent in the second heat exchanger 211b. In an example embodiment, in order for the feed to exchange heat with the permeate in the second heat exchanger 211b, the feed is at a higher temperature than the permeate.

The second heat exchanger 211b may be configured to be similar to the first heat exchanger 211a, but with a difference that the permeate is used as a cooling agent instead of the concentrate. Alternatively, the second heat exchanger 211b may have a different geometry than the first heat exchanger 211a, may have a different heat transfer area, or may have different passive or active cooling devices. In an example implementation, the second heat exchanger 211b may include heatsinks, fans, heat pipes, and the like. Additionally, besides using permeate as a cooling agent, the second heat exchanger 211b may also use other approaches for cooling feed (e.g., using chilled fluids, such as water, using thermoelectric cooling, using refrigeration system, and the like).

In some implementations of the system 100 or 200, the temperature difference between the concentrate, prior to entering the heat exchanger 111 or the first heat exchanger 211a, and the feed prior to entering the heat exchanger 111 or the first heat exchanger 211a is between about 10-40 degrees Celsius. Additionally, or alternatively, the temperature difference between the concentrate prior to entering the first heat exchanger 211a, and the permeate prior to entering the second heat exchanger 211b, is relatively small (e.g., less than a few degrees Celsius). However, in some implementations, the temperature difference between the concentrate and the permeate may be up to about fifteen degrees Celsius. After the first heat exchanger 111 (or the first heat exchanger 211a), the temperature of the feed and the temperature of the concentrate (after being heated in the first heat exchanger 111) is about 1° to 20° C. For example, the feed temperature (after passing through the first heat exchanger 111) may be between 60°-75° C., and the concentrate temperature (after passing through the first heat exchanger 111) may be between 80°-85° C.

Figure 3:
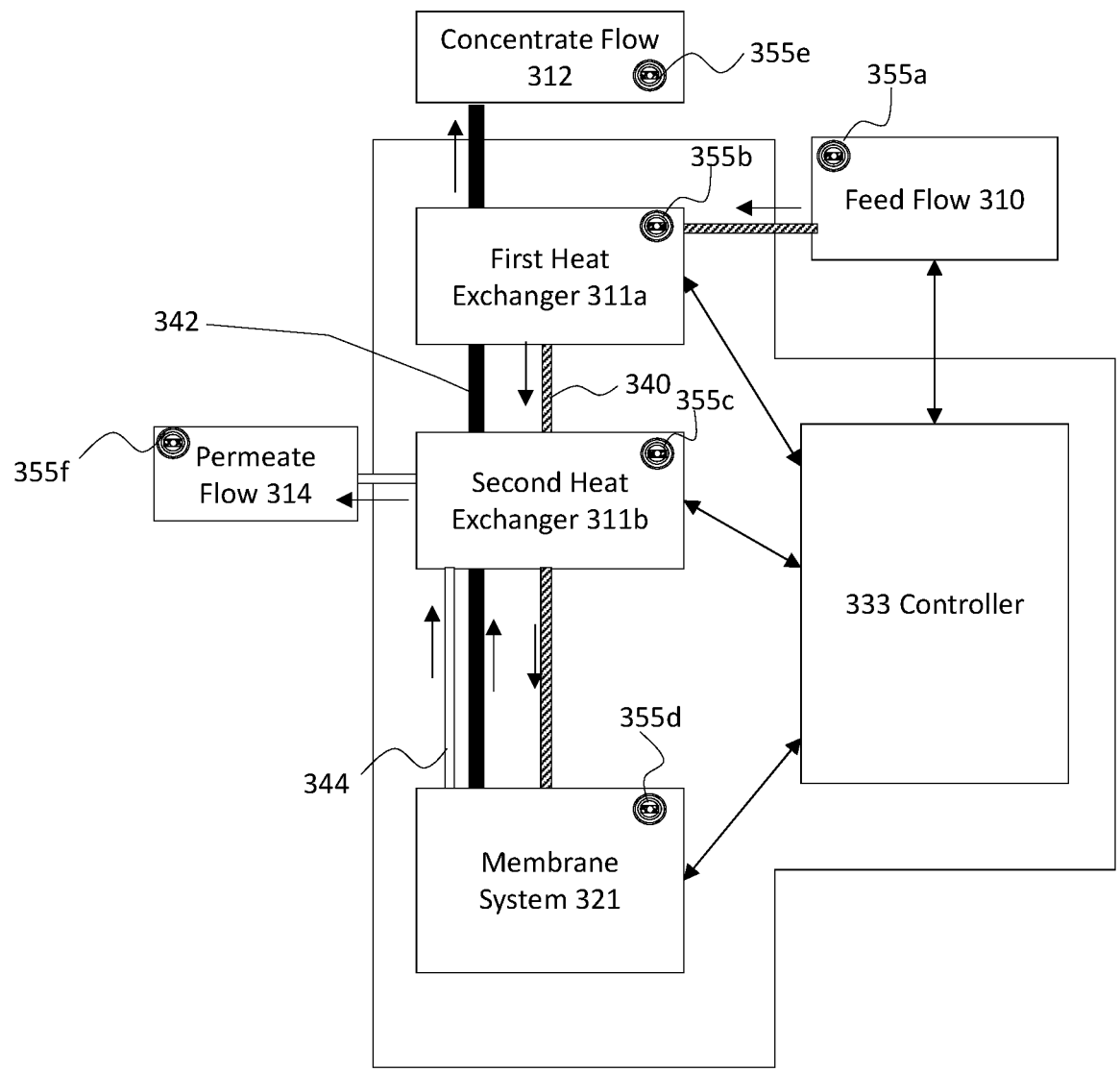
FIG. 3 is an example system, including a controller for processing a feed, according to an embodiment.

In various implementations, the system 100 and/or the system 200 may include a controller configured to control temperatures of the feed for the membrane system 121 or 221. An example controller 333 for a system 300 is shown in FIG. 3. The system 300 may be the same as the system 200 except that the system 300 further includes the controller 333 and any one or a combination of sensor 355a-355f. Example sensors 355a-355f may include flowrate sensors, pressure sensors, temperature sensors, velocity sensors, and the like.

As shown in FIG. 3, the system 300 includes a first heat exchanger 311a a second heat exchanger 311b, a membrane system 321, a controller 333, and one or a combination of sensors 355a-355f. The controller 333 can be configured to control various aspects of operations of system 300. In an example implementation, the controller 333 can be configured to control a feed flow 310. In an example implementation, the feed flow 310 is controlled by controlling a suitable device for providing the feed flow 310. For example, the controller 333 can be configured to control a pump for providing the feed flow 310 to the membrane system 321. The controller 333 may be configured to control a flowrate or pressure of the feed at the inflow to the first heat exchanger 311a. In an example embodiment, a flowrate sensor 355a associated with the feed flow 310 is configured to provide data to the controller 333, and the controller 333 is configured to adjust the flowrate based on the data from the sensor 355a. As shown in FIG. 3, the feed is flown through a line 340, the concentrate is flown through line 342, and the permeate is flown through a line 344.

Further, the controller 333 can be configured to receive data from the sensors 355b and 355c associated with the heat exchangers 311a and 311b respectively and control various operational parameters of these heat exchangers, as further described below in relation to FIGS. 4-11. Additionally, the controller 333 can be configured to receive data from the sensor 355d associated with the membrane system 321 and control various operational parameters based on the received data, as further described below. The controller 333 may determine parameters associated with a concentrate flow 312 using the sensor 355e and a permeate flow 314 using the sensor 355f. For example, the controller 333 may determine flowrates of the concentrate and the permeate, or/and temperatures associated with the concentrate and the permeate.

Figure 4A:
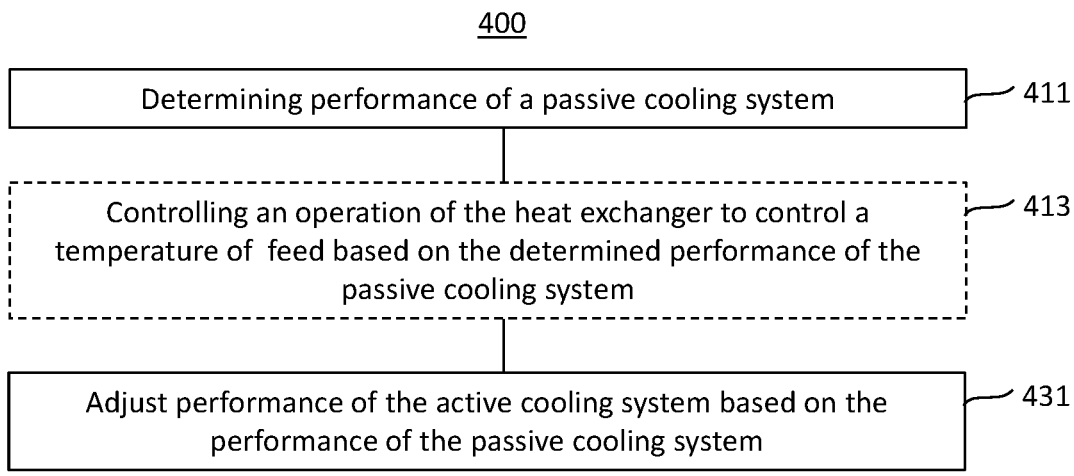
FIG. 4A is an example process of adjusting the performance of an active cooling system, according to an embodiment.

FIG. 4A shows an example embodiment of a process 400 performed by a controller (e.g., the controller 333) for controlling a cooling system of a membrane system (e.g., the membrane system 121, 221, or 321). At step 411, the controller is configured to determine the performance of a passive cooling system associated with the membrane system. For example, the controller may determine if the passive cooling system is removing an adequate amount of heat from the membrane system. The heat removal from the membrane system by the passive cooling system may be based on various environmental factors (e.g., based on the temperature and/or airflow of ambient air) as well as the temperature of the membrane system. In some cases, the controller may be configured to determine the temperature of a membrane of the membrane system. If the temperature of the membrane is not within a target temperature range, the controller may determine that performance of a passive cooling system is not sufficient to cool the membrane system.

Alternatively, if the temperature of the membrane is within the target temperature range, the controller may determine that performance of the passive cooling system is sufficient. The target temperature range for the membrane may be selected specific to the particular membrane that is being used. For example, for graphene oxide membranes, the target temperature range may be between 60°-75° C., including all the temperature values in between. It should be understood that in some cases, graphene oxide membranes may also operate at lower temperatures (e.g., at a target temperature range of 30°-60° C.). Other types of membranes (e.g., polyamide membranes, membranes with cellulose or polyester, or membranes formed from materials that degrade at higher temperatures) may be configured to have a target temperature range that is typically lower than the target temperature range used for graphene oxide membranes. For example, these other types of membranes may operate within the target temperature range of 30°-60° C.

If the performance of the passive cooling system is not sufficient, the controller is configured to adjust the performance of an active cooling system associated with the membrane system. For example, if the passive cooling system removes only a fraction of the heat from the membrane system, the controller is configured to engage the active cooling system to remove the remaining amount of heat from the membrane system to maintain the membrane of the membrane system within a target range of temperature.

In some cases, the controller may gradually increase the heat transfer rate by the active cooling system while monitoring the temperature of the membrane. When the temperature of the membrane reaches a target value or range, the controller may be configured to stop increasing the heat transfer. The controller may use various approaches for increasing the heat transfer by the active cooling system, which may include, but not limited to, increasing a flow of cooling fluid past heat transfer surfaces of the membrane system, activating water sprayers configured for spraying heated surfaces (e.g., surfaces of a heatsink), activating fans, or engaging a cooling refrigeration system that may be associated with active cooling system, and the like.

As an optional step 413, the controller is configured to control the operation of a heat exchanger (e.g., the heat exchanger 111, 211a, 211b, 311a, or 311b) to control the temperature of the feed based on the determined performance of the passive cooling system of the membrane system, and/or based on a temperature of the membrane of the membrane system. In an example implementation, the controller may be configured to control the amount of heat removed from the feed by allowing a portion of the feed to bypass the heat exchanger. The bypassed "hot" feed can then be mixed with a "cool" portion of the feed, thus resulting in a target temperature of the feed. By supplying the feed at a target temperature (or at a temperature that is within a target temperature range, such as for example within a temperature range of 60-75° C., including all the temperature values and ranges in between), the membrane system may be maintained at a steady temperature and may not experience temperature fluctuations associated with the variations in feed temperature, outdoor weather conditions, and the like.

Figure 4B:
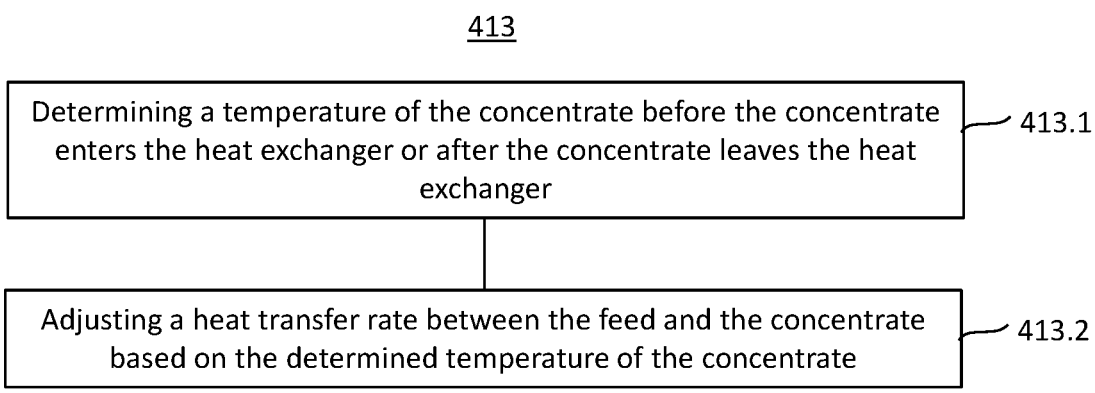
FIG. 4B are example sub-steps of the process of FIG. 4A, according to an embodiment.

FIG. 4B shows sub-steps of step 413 of the process 400. For example, at sub-step 413.1, the controller is configured to determine the temperature of the concentrate before the concentrate enters the heat exchanger. In some implementations, at step 413.1, the controller is configured to determine the temperature of the concentrate after the concentrate leaves the heat exchanger. At sub-step 413.2, the controller is configured to adjust a heat transfer rate between the feed and the concentrate based on the determined temperature of the concentrate. For example, the controller may increase/reduce the heat transfer rate by increasing/reducing the heat transfer area between the feed and the concentrate. In an example implementation, such increase/reduction may be obtained via opening/closing valves configured to allow the feed to flow through an extended piping system.

In some cases, the feed may be delivered to the membrane system in a batch mode. For example, the feed may enter the heat exchanger and circulate withing the heat exchanger for a selected period of time (which may be controlled by the controller), thus transferring the heat to the concentrate during that time. After sufficient cooling is achieved, the feed can be directed from the heat exchanger to the membrane system or a second heat exchanger (e.g., the heat exchanger 211b or 311b) using the controller. For example, the controller may be configured to open/close suitable valves to direct the feed from the heat exchanger towards the membrane system or the second heat exchanger.

Figure 5:
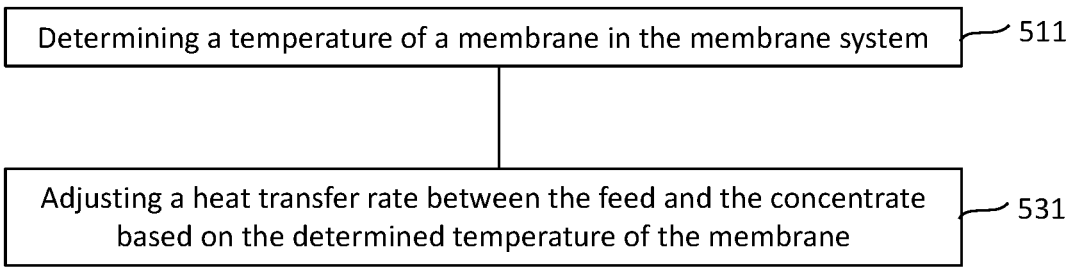
FIG. 5 is an example process of adjusting a heat transfer between a feed and a concentrate, according to an embodiment.

FIG. 5 shows an example process 500 performed by a controller (e.g., the controller 333) for controlling cooling system of a membrane system, which may be a simplified variation of the process 400. At step 511, the controller is configured to determine the temperature of a membrane in the membrane system, and at step 531, adjust a heat transfer rate between the feed and the concentrate based on the determined temperature of the membrane to reduce or increase the temperature of the membrane such that the temperature of the membrane is within a target temperature range. In some cases, the step of adjusting of the heat transfer rate can be performed iteratively, until the temperature of the membrane is within the target temperature range. For example, by adjusting the heat transfer rate, the controller is configured to increase a temperature of the feed if the membrane temperature is below a target temperature value and decrease the temperature of the feed if the membrane temperature is above the target temperature value.

Figure 6:
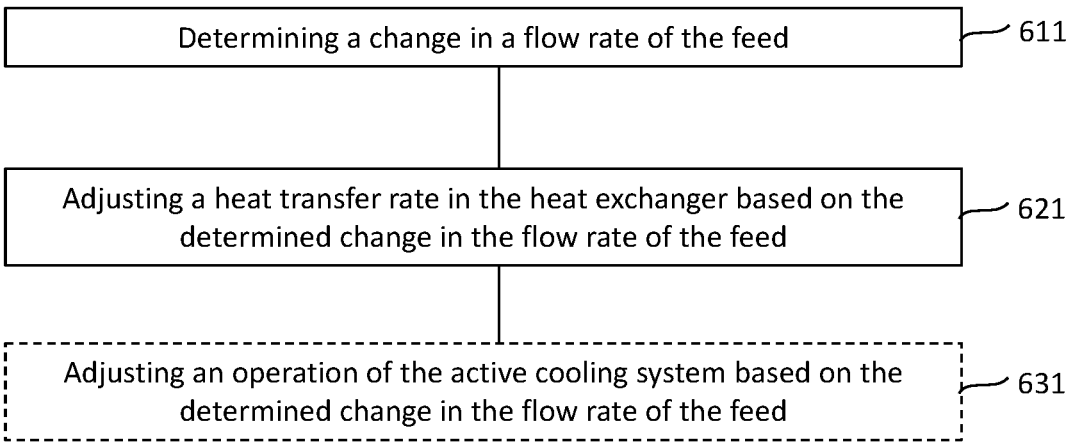
FIG. 6 is an example process of adjusting a heat transfer rate in a heat exchanger and adjusting an operation of an active cooling system, according to an embodiment.

FIG. 6 shows another example process 600 performed by a controller (e.g., the controller 333) for controlling temperature of a membrane system. At step 611, the controller is configured to determine if a change of feed flow is observed. In an example embodiment, the data regarding the feed flow rate may be reported by a sensor. At step 621, the controller is configured to adjust a heat transfer rate in a heat exchanger based on the determined change in the flow rate of the feed. For example, the heat transfer rate may be increased if the flow rate of the feed is increased or decreased if the flow rate is decreased. In some implementations, an increase in the heat transfer may be at least partially due to an increase in a flow rate of the concentrate (or permeate). Additionally, or alternatively, changes in heat transfer may be due to any other approaches (e.g., increase or decrease of heat transfer area, increase or decrease of convective cooling due to activation of fans, and the like). At step 631 (which may be an optional step), the controller is configured to adjust an operation of the active cooling system based on the determined change in the flow rate of the feed. For example, the active cooling system may be adjusted such that more or less heat is extracted from the membrane system.

In various implementations, the systems 100-300 may be configured to operate at feed flow rates that range between a few tens to a few hundred klb/hr. For example, the systems 100-300 may operate at a feed flow rate ranging between about 165 to about 220 klb/hr. Further, the heat exchanger may be configured to operate at flow rates for the concentrate in a range of a few tens to a few hundred klb/hr. In an example implementation, the heat exchanger is configured to operate at a concentrate flow rate in a range of about 110 to about 165 klb/hr.

In some cases, the heat exchanger is configured to heat the concentrate to a desired temperature. In an example implementation, operations of the heat exchanger may be configured to pursues two goals: (1) to cool the feed to a target feed temperature $T_{f\,ref}$, and (2) to heat the concentrate to a target concentrate temperature $T_{c\,ref}$. In some cases, both of these goals cannot be achieved simultaneously, and tradeoffs may be determined. For example, the controller may adjust a heat transfer rate between the feed and the concentrate based on the determined concentrate temperature ($T_c$) and feed temperature ($T_f$) to minimize a system objective function F. In an example implementation, the temperature $T_c$ is measured as the concentrate leaves a membrane system (e.g., the membrane system 321, as shown in FIG. 3) and prior to entering a heat exchange (e.g., the heat exchanger 311a, as shown in FIG. 3). Further, the temperature $T_f$ is measured before the heat enters the heat exchanger 311a. The objective function F can characterize such tradeoffs. For example, objective function F is at the absolute minimum if it is possible to achieve both $T_{c\,ref}$ and $T_{f\,ref}$ simultaneously. Objective function F is, however, larger than the absolute minimum value if $T_c$ is different from $T_{c\,ref}$ or/and if $T_f$ is different from $T_{f\,ref}$. An example objective function may be given by $F=w_1(T_c-T_{c\ ref})^2+w_2(T_f-T_{f\ ref})^2$, wherein $w_1$ and $w_2$ are weights ranging between zero and one. In an example embodiment, if it is determined that it is much more important for $T_f$ to be close to $T_{f\ ref}$, then $w_2$ is close to 1 and $w_1$ is close to 0 (e.g., $w_2$ is about 0.9 and $w_1$ is about 0.1). Alternatively, if it is determined that it is much more important for $T_c$ to be close to $T_{c\ ref}$, then $w_1$ is close to 1, and $w_2$ is close to 0.

Figure 7:
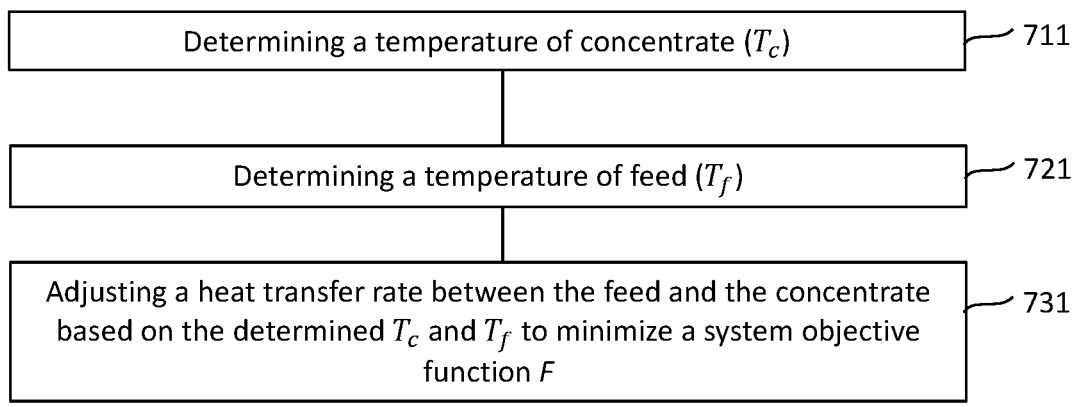
FIG. 7 is another example process of adjusting a heat transfer between a feed and a concentrate, according to an embodiment.

FIG. 7 shows an example process 700 that may be performed by a controller (e.g., the controller 333) to adjust a heat transfer rate between the feed and the concentrate. At step 711, the controller is configured to determine the temperature of the concentrate ($T_c$), and at step 721, the controller is configured to determine the temperature of the feed ($T_f$). In an example implementation, the controller determines $T_c$ and $T_f$ by obtaining data from temperature sensors. At step 731, the controller is configured to adjust the heat transfer rate between the feed and the concentrate based on the determined $T_c$ and $T_f$ to minimize the system objective function F as described above.

Figure 8:
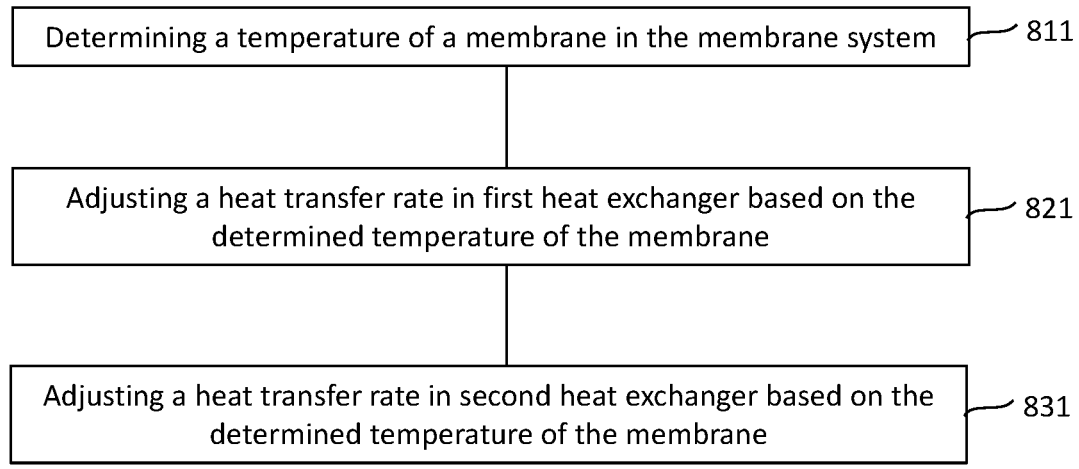
FIG. 8 is an example process of adjusting a heat transfer rate in a first heat exchanger and a second heat exchanger, according to an embodiment.

FIG. 8 shows an example process 800 that may be performed by a controller (e.g., the controller 333) to adjust a heat transfer in a first heat exchanger (e.g., the first heat exchanger 211a or 311a) and a second heat exchanger (e.g., the second heat exchanger 211b or 311b) based on a temperature of a membrane in the membrane system. At step 811, the controller is configured to determine a temperature of a membrane in the membrane system. Such determination may be made by the controller by receiving membrane temperature data from a temperature sensor associated with the membrane. At step 821, the controller is configured to adjust a heat transfer rate in the first heat exchanger based on the determined temperature of the membrane using any suitable approach discussed above (e.g., by increasing or decreasing a heat transfer area). At step 831, the controller is configured to adjust a heat transfer rate in the first heat exchanger based on the determined temperature of the membrane using any suitable approaches discussed above. In an example embodiment, the controller may be configured to increase a first heat transfer rate in the first heat exchanger by 20 percent and increase a second heat transfer rate in the second heat exchanger by 50 percent. It should be noted that any other suitable adjustment may be used. For example, if heating the concentrate is needed without significantly cooling the feed, the first heat transfer rate may be increased, while the second heat transfer rate may be decreased.

Figure 9:
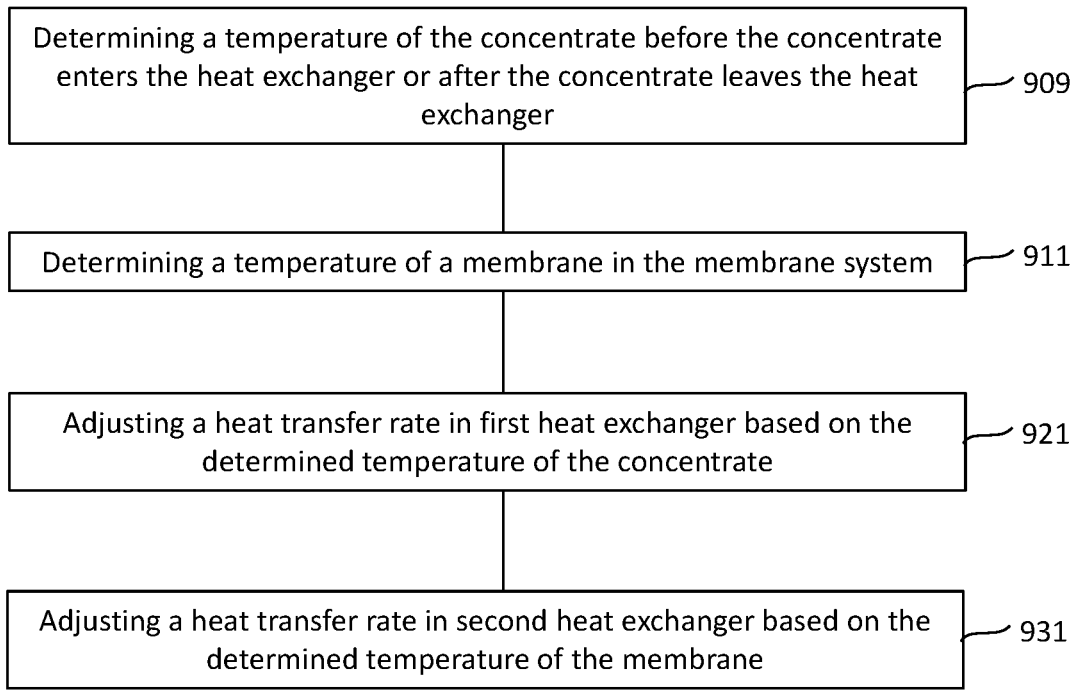
FIG. 9 is another example process of adjusting a heat transfer rate in a first heat exchanger and a second heat exchanger, according to an embodiment.

FIG. 9 shows an example process 900 that may be performed by a controller (e.g., the controller 333) to adjust a heat transfer in a first heat exchanger (e.g., the first heat exchanger 211a or 311a) and a second heat exchanger (e.g., the second heat exchanger 211b or 311b) based on a temperature of a membrane in the membrane system or temperature of the concentrate. At step 909, the controller is configured to determine the temperature of the concentrate before the concentrate enters the first heat exchanger or after the concentrate leaves the first heat exchanger. At step 911, the controller is configured to determine a temperature of a membrane in the membrane system. At step 921, the controller is configured to adjust a heat transfer rate in the first heat exchanger based on the determined temperature of the concentrate using any suitable approach discussed above (e.g., by increasing or decreasing a heat transfer area). At step 931, the controller is configured to adjust a heat transfer rate in the second heat exchanger based on the determined temperature of the membrane using any suitable approaches discussed above.

In some cases, the first heat exchanger is configured to heat the concentrate to a desired temperature $T_{c\ ref}$ and to heat the permeate to a desired temperature $T_{p\ ref}$. In an example implementation, operations of the first heat exchanger may be configured to pursue three goals: (1) to cool the feed to a target feed temperature $T_{f\ ref}$, (2) to heat the concentrate to a target concentrate temperature $T_{c\ ref}$, and (3) to heat the permeate to a target permeate temperature $T_{p\ ref}$. In some cases, these three goals cannot be achieved simultaneously, and tradeoffs may be determined. For example, the controller may: adjust a heat transfer rate between the feed and the concentrate based on the determined concentrate temperature ($T_c$) and feed temperature ($T_f$), and adjust a heat transfer rate between the feed and the permeate based on the determined $T_c$ and permeate temperature ($T_p$) to minimize a system objective function F. In an example implementation, the temperature $T_p$ is measured as the permeate leaves a membrane system (e.g., the membrane system 321, as shown in FIG. 3) and prior to entering a heat exchange (e.g., the heat exchanger 311b, as shown in FIG. 3). The objective function can characterize such tradeoffs. For example, objective function F is at the absolute minimum if it is possible to achieve that $T_{c\ ref}$ is $T_c$, $T_{f\ ref}$ is $T_f$, and that $T_{p\ ref}$ is $T_p$ simultaneously. The objective function F is, however, larger than the absolute minimum value if $T_c$ is different from $T_{c\ ref}$ and/or if $T_f$ is different from $T_{f\ ref}$, or/and if $T_p$ is different from $T_{p\ ref}$. An example objective function may be given by $F=w_1(T_c-T_{c\ ref})^2+w_2(T_f-T_{f\ ref})^2+w_3(T_p-T_{p\ ref})^2$, wherein $w_1$, $w_2$, and $w_3$ are weights ranging between zero and one. In an example embodiment, if it is much more important for $T_f$ to be close to $T_{f\ ref}$, then $w_2$ is close to 1 and $w_1$ is closed to 0, $w_3$ is close to 0. For example, $w_2$ is about 0.9, $w_1$ is about 0.08, and $w_3$ is about 0.02. Alternatively, if it is much more important for $T_c$ to be close to $T_{c\ ref}$, then $w_1$ is close to 1, $w_2$ is close to 0, and $w_3$ is close to 0. In some cases, $w_3=0$, and objective function is $F=w_1(T_c-T_{c\ ref})^2+w_2(T_f-T_{f\ ref})^2$. It should be appreciated that the expression for the cost function F as described above is only one possible expression, and other suitable expressions may be used. For example, cost function F may be calculated as $F=w_1|T_c-T_{c\ ref}|+w_2|T_f-T_{f\ ref}|+w_3|T_p-T_{p\ ref}|$, or using any other suitable expression (herein $|T_c-T_{c\ ref}|$ is an absolute value of a difference $T_c-T_{c\ ref}$).

Figure 10:
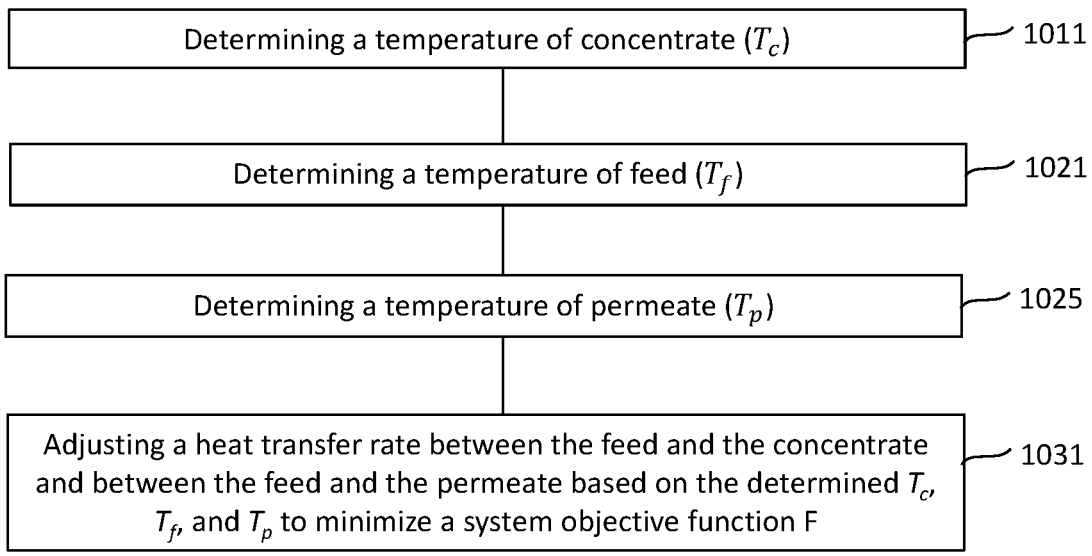
FIG. 10 is an example process of adjusting a heat transfer between a feed and a concentrate and adjusting a heat transfer between a feed and a permeate, according to an embodiment.

FIG. 10 shows an example process 1000 that may be performed by a controller (e.g., the controller 333) to adjust a heat transfer rate between the feed and the concentrate. At step 1011, the controller is configured to determine the temperature of the concentrate ($T_c$), at step 1021, the controller is configured to determine the temperature of the feed ($T_f$), and at step 1025, the controller is configured to determine the temperature of the permeate ($T_p$). In an example implementation, the controller determines $T_c$, $T_f$, and $T_p$ by obtaining data from temperature sensors. At step 1031, the controller is configured to adjust the heat transfer rate between the feed and the concentrate, and between the feed and the permeate, based on the determined $T_c$, $T_f$, and $T_p$ to minimize the system objective function F as described above.

Figure 11:
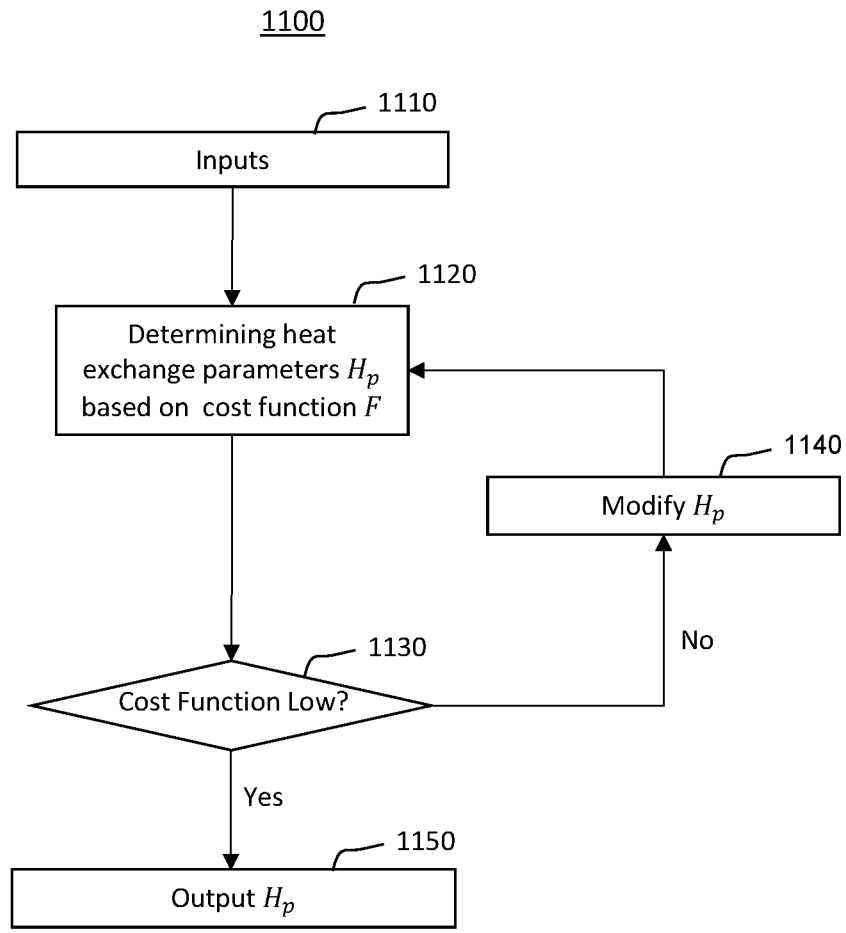
FIG. 11 is an example process of determining heat exchange parameters, according to an embodiment.

FIG. 11 illustrates an example process 1100 of determining heat exchange parameters $H_p$ based on cost function F. In an example embodiment, heat exchange parameters are parameters that control heat transfer rates for first and second heat exchangers. For example, such parameters may be heat transfer areas for first and second heat exchangers, the power delivered to fans of the first heat exchanger and/or second heat exchanger, or any other parameters associated with the heat exchangers that control heat transfer rates for these heat exchangers. At step 1110, inputs (e.g., $T_c$, $T_f$, and $T_p$) are used to determine cost function F. In some cases, temperature of the membrane of the membrane system may also be used as an input. In an example embodiment, cost function F may be calculated as $F=T_c-T_{c\ ref})^2+w_2(T_f-T_{f\ ref})^2+w_3(T_p-T_{p\ ref})+w_4(T_m-T_{m\ ref})^2$, where $T_m$ is a temperature of a membrane determined by an associated sensor, and $T_{m\ ref}$ is a reference temperature for the membrane. Further, $w_4$ is a weight associated with the term $(T_m-T_{m\ ref})^2$.

At step 1130, the controller evaluates whether the cost function computed for inputs provided at step 1110 is sufficiently low. For example, the controller may check that the cost function is lower than a predetermined threshold, and if that is the case (step 1130, Yes), the controller is configured to output heat exchange parameters $H_p$ at step 1150. Alternatively, if the generated cost function is not sufficiently low (step 1130, No), the controller is configured to further modify heat exchange parameters $H_p$ at step 1140, and proceed to step 1120, at which a new cost function is determined.

Examples of Temperature, Flow Rate, Pressure, Recovery Rate, and Heat Loading Parameters In some implementations of the systems 100-300, the feed is a liquid (e.g., a dark liquor that is used in Kraft process when making a paper). In an example implementation, temperatures for the feed may be 100 degrees Celsius (100° C.) or less. In some implementations, the feed temperatures are 80° C. to 95° C. In an example implementation, a concentrate from a filtration process (when using a membrane system, such as membrane system 321, as shown in FIG. 3) may have the temperature $T_c$ that is a few degrees lower than the feed temperature $T_f$ (e.g., $T_c$ may be about 5° C. lower than $T_f$). A permeate can be produced at a temperature that may be controlled (e.g., by cooling membrane system 321). In an example implementation the permeate temperature $T_p$ may be in a range of 70-80° C. However, other values for $T_p$ may be used, depending on the process requirements. In some cases, $T_p$ may range between 50° C. to 65° C. In various implementations, $T_p$ is likely to be larger than 40° C.

In some implementations of the systems 100-300, the flow rate of the feed to the heat exchanger (e.g., the feed flow 310) may range between 165 to 220 klb/hr. In some cases, when the feed is the black liquor, 300 to 400 GPM gallons per minute (GPM) may be used as the feed flow rate. The flow rate of the concentrate delivered by the membrane system may vary depending on the membrane system recovery. In some cases, the flow rate for the concentrate may be in the range of 110 to 165 klb/hr, which is equivalent to 200 to 300 GPM. The flow rate of the permeate can be determined as a difference in mass flow of the feed and the concentrate and is thus about 100 GPM. In some implementations, the flow rate of the permeate for a weak black liquor (WBL) concentration is at least about 10%, at least about 15%, at least about 20%, or at least about 25% of the feed flow rate. In some implementations, the flow rate of the permeate for a WBL concentration is no more than about 40%, no more than about 45%, no more than about 50%, no more than about 55%, or no more than about 60% of the feed flow rate. Combinations of the above-referenced ranges for the ratio of the permeate flow rate over the feed flow rate are also contemplated. For example, the flow rate of the permeate may be between 10%-30% or between 30%-60% of the feed flow rate, including all values or ranges in between. In various implementations, the systems 100-300 may be scaled to have feed flow rates that are about 5 to 20 times than the flow rate of 300 GPM. For example, larger systems may have the feed flow rate of 6000 GPM.

In various implementations, heat exchangers used by the systems 100-300 may operate near atmospheric pressure (100 psi or less). In some implementations, the systems 100-300 may not utilize compressors, refrigeration, etc. due to the elevated temperature and liquid phase. In some implementations, pressures for the heat exchangers may not be substantially below atmospheric pressure. For example, in some implementations, the pressures may be less than atmospheric pressure by at most 5% to 10%.

In various implementations of a membrane system (e.g., membrane system 321, as shown in FIG. 3), the mass flow of the concentrate (and/or the permeate) is lower than feed mass flow (e.g., the mass flow of the concentrate may be 40% to 80% of the feed mass flow). Thus, the temperature change between the inlet temperature (e.g., the temperature of the concentrate prior to entering the heat exchanger) and the outlet temperature (e.g., the temperature of the concentrate after exiting the heat exchange) is larger than the temperature change of the feed. This has the benefit of allowing the concentrate to be heated to nearly the same temperature as the temperature of the feed ($T_f$). The permeate can also be used to dissipate heat from the feed. It should be noted that various processes involving the feed and the concentrate typically occur at higher temperatures than those for the permeate, thus, the permeate is expected to be at a lower temperature than the feed and the concentrate.

Considering the feed flow rates of 300 to 400 GPM, as well as temperatures and flow rates discussed above, the feed/concentrate heat exchange may require a 6.5-7.0 MBTU/hr heat exchange operation. This translates to about 950-1000 ft$^2$ of effective heat transfer area assuming an overall heat transfer coefficient of 432 BTU/hr·ft$^2$·F. In some implementations, the concentrate temperature may be about 50-60° C. to cool the feed to about 70° C. Conservatively, assuming an overall heat transfer coefficient for the system at 2.6 BTU/hr·ft$^2$·F, this would mean that about 25,000 ft$^2$ of the heat transfer area is may be used with the ambient air temperature at 25° C. In some cases, various enclosures (vessels) of the systems 100-300 may contribute about 8000 ft$^2$ of this heat transfer area with the remaining heat dissipation being provided by the heat transfer area of piping of the systems 100-300. In cases when convective heat transfer process dominates the heat transfer, a smaller heat transfer area may be used.

As discussed above and further recapped here, passive and active cooling strategies may be used. For example, heat exchangers of the systems 100-300 may dissipate heat to the surroundings passively just by having uninsulated piping and membrane housings. However, it may also have more active cooling such as the spraying of water on tanks or membrane housings, cooling fins for greater passive cooling, or active air-cooling systems, or additional heat exchangers in contact with cooling water or other process fluids. The use of a flow control bypass loop around a heat exchanger (e.g., the heat exchanger 311*a*) can improve the setpoint control for feed temperature to a membrane system (e.g., the membrane system 321). For example, in cooler months or particularly windy days, passive cooling on the system will naturally be greater and thus lead to potentially greater than desired heat removal from the feed stream. Use of a flow-controlled bypass loop will allow a control system (e.g., the controller 333) to bypass as much feed as necessary around the exchanger to control to a desired system inlet temperature.

Example parameters for operating the systems 100-300 are further summarized in tables T1 and T2 as shown in FIG. 12. For example, table T1 shows possible parameters related to a heat exchanger (e.g., the heat exchanger 311a, as shown in FIG. 3). For example, table T1 shows the feed flow rate (into the heat exchanger 311a), the concentrate flow rate (from a membrane system, such as the membrane system 321, as shown in FIG. 3), the feed temperature in (e.g., the feed temperature before the feed enters the heat exchanger 311a), the feed temperature out (e.g., the feed temperature after the feed exits the heat exchanger 311a), the concentrate temperature in (e.g., the concentrate temperature before the concentrate enters the heat exchanger 311a), the concentrate temperature out (e.g., the concentrate temperature after the concentrate exits the heat exchanger 311a), and the total of heat transferred between the feed and the concentrate in the heat exchanger 311a. Table T2 shows possible parameters related to a heat loss in the membrane system 321, such as the feed flow rate in (e.g., the feed flow rate into the membrane system 321), the concentrate flow out (e.g., the concentrate flow out of the membrane system 321), the feed temperature in (e.g., the feed temperature before the feed enters the membrane system 321), the concentrate temperature out (e.g., the concentrate temperature after the concentrate exits the membrane system 321), the total of heat transferred between the feed and the concentrate in the membrane system 321, the total heat transfer area associated with the membrane system 321, the heat transfer area associated with an enclosure (vessel) for the membrane system 321, and the heat transfer area associated with piping of the membrane system 321.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain using no more than routine experimentation, many equivalents to the specific inventive embodiments described herein. It is, therefore, to be understood that the foregoing embodiments are presented by way of example only and that, within the scope of the appended claims and equivalents thereto; inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of the present technology may be implemented using hardware, firmware, software, or a combination thereof. When implemented in firmware and/or software, the firmware and/or software code can be executed on any suitable processor or collection of logic components, whether provided in a single device or distributed among multiple devices.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The terms "substantially," "approximately," and "about" used throughout this Specification and the claims generally mean plus or minus 10% of the value stated, e.g., about 100 would include 90 to 110.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A system for concentrating a liquid feed, the system comprising:
    a membrane system configured to receive the liquid feed and produce a concentrate and a permeate, the membrane system including:
        a graphene oxide membrane configured to operate at a membrane temperature of at least 60° C.;
        a passive cooling system, the passive cooling system including uninsulated piping, a membrane housing, or a combination thereof; and
        an active cooling system;
    a heat exchanger in fluid communication with the membrane system and disposed upstream of the membrane system such that the liquid feed enters the membrane system immediately after exiting the heat exchanger, the heat exchanger configured to cool the liquid feed and heat the concentrate by transferring heat from the liquid feed to the concentrate; and
    a controller configured to:
        determine performance of the passive cooling system; and
        adjust an operation of the active cooling system based on the determined performance of the passive cooling system, such that the cooling of the membrane system is at a target cooling level.

2. The system of claim 1, wherein the liquid feed comprises black liquor.

3. The system of claim 1, wherein the heat exchanger operates at about atmospheric pressure.

4. The system of claim 1, wherein the heat exchanger is configured to transfer about 0.24 to about 0.39 BTU/gallon from the liquid feed to the concentrate.

5. The system of claim 1, wherein the heat exchanger is configured to have a heat transfer coefficient in a range of about 100 to about 500 BTU per hour-square feet-Fahrenheit.

6. The system of claim 1, wherein the heat exchanger is configured to have about 900 to about 1,000 square feet of effective heat transfer area.

7. The system of claim 1, wherein the active cooling system includes at least one of a water sprayer, a heat sink with cooling fins, or a membrane system heat exchanger.

8. The system of claim 1, wherein the controller is further configured to control an operation of the heat exchanger to control a temperature of the liquid feed based on the determined performance of the passive cooling.

9. The system of claim 1, wherein the controller is further configured to:
    determine a temperature of the concentrate before the concentrate enters the heat exchanger or after the concentrate leaves the heat exchanger; and
    adjust a heat transfer rate between the liquid feed and the concentrate based on the determined temperature of the concentrate.

10. The system of claim 9, wherein adjusting the heat transfer rate includes reducing or increasing an effective heat transfer area of the heat exchanger.

11. The system of claim 9, wherein adjusting the heat transfer rate includes:
    separating a flow of the liquid feed into a first flow and a second flow, wherein:
        the first flow is configured to pass through the heat exchanger;
        the second flow is configured to bypass the heat exchanger; and the controller is configured to determine a magnitude of the first flow and/or second flow; and recombining the first and the second flow after the first flow passes through the heat exchanger.

12. The system of claim 1, wherein the controller is further configured to:
    determine the membrane temperature and adjust a heat transfer rate between the liquid feed and the concentrate based on the determined membrane temperature.

13. The system of claim 12, wherein the controller is configured to:
    increase a temperature of the liquid feed if the membrane temperature is below a target temperature value; and
    decrease the temperature of the liquid feed if the membrane temperature is above the target temperature value.

14. The system of claim 1, wherein a temperature difference between the concentrate prior to entering the heat exchanger and the liquid feed prior to entering the heat exchanger is between about 10-40 degrees Celsius.

15. The system of claim 1, wherein the system includes a controller is further configured to:
    determine a temperature ($T_c$) of the concentrate;
    determine a temperature ($T_f$) of the liquid feed; and
    adjust a heat transfer rate between the liquid feed and the concentrate based on the determined $T_c$ and $T_f$ to minimize a system objective function F.

16. The system of claim 15, wherein the system objective function F is $F=w_1(T_c-T_{c\ ref})^2+w_2(T_f-T_{f\ ref})^2$, wherein $T_{c\ ref}$ is a concentrate reference temperature, and $T_{f\ ref}$ is a liquid feed reference temperature, and $w_1$ and $w_2$ are weights ranging between zero and one.

17. The system of claim 1, wherein the controller is further configured to:
    determine a change in a flow rate of the liquid feed; and
    adjust a heat transfer rate in the heat exchanger based on the determined change in the flow rate of the liquid feed.

18. The system of claim 1, wherein the controller is further configured to:
    determine a change in a flow rate of the liquid feed;
    adjust a heat transfer rate in the heat exchanger based on the determined change in the flow rate of the liquid feed; and
    adjust an operation of the active cooling system based on the determined change in the flow rate of the liquid feed.

19. The system of claim 1, wherein the liquid feed enters the heat exchanger at a flow rate of about 165 to about 220 klb/hr.

20. The system of claim 1, wherein the concentrate enters the heat exchanger at a flow rate of about 110 to about 165 klb/hr.

21. A system for concentrating a liquid feed, the system comprising:
    a membrane system configured to receive the liquid feed and produce a concentrate and a permeate, the membrane system including:
        an active cooling system, a passive cooling system, or a combination thereof; and
        a graphene oxide membrane configured to operate at a membrane temperature of at least 60° C.;
    a first heat exchanger in fluid communication with the membrane system and disposed upstream of the membrane system;
    a second heat exchanger in fluid communication with both the first heat exchanger and the membrane system and disposed between the first heat exchanger and the membrane system, such that the liquid feed enters the first heat exchanger, the second heat exchanger, and the membrane system sequentially; and
    a controller configured to:
        determine the membrane temperature;
        adjust a heat transfer rate in the first heat exchanger based on the determined membrane temperature; and
        adjust a heat transfer rate in the second heat exchanger based on the determined membrane temperature;
    wherein:
        the first heat exchanger is configured to cool the liquid feed and heat the concentrate by transferring heat from the liquid feed to the concentrate; and
        the second heat exchanger is configured to cool the liquid feed and heat the permeate by transferring heat from the liquid feed to the permeate.

22. The system of claim 21, wherein the liquid feed includes black liquor.

23. The system of claim 21, wherein the controller is further configured to:
    determine a temperature of the concentrate before the concentrate enters the first heat exchanger or after the concentrate leaves the first heat exchanger; and
    adjust the heat transfer rate in the first heat exchanger based on at least one of the determined temperature of the concentrate, or the membrane temperature.

24. The system of claim 21, wherein the controller is further configured to:
    determine a change in a flow rate of the liquid feed; and
    adjust the heat transfer rate in the first heat exchanger or the second heat exchanger based on at least one of the determined change in the flow rate of the liquid feed or the membrane temperature.

25. The system of claim 21, wherein the controller is further configured to:
    determine a temperature ($T_c$) of the concentrate;
    determine a temperature ($T_f$) of the liquid feed;
    determine a temperature ($T_p$) of the permeate; and
    adjust a heat flow between the liquid feed and the concentrate and between the liquid feed and the permeate based on the determined $T_c$, $T_f$, and $T_p$ to minimize a system objective function F.

26. The system of claim 25, wherein the system objective function F is $F=w_1(T_c-T_{c\ ref})^2+w_2(T_f-T_{f\ ref})^2$, wherein $T_{c\ ref}$ is a concentrate reference temperature, and $T_{f\ ref}$ is a feed reference temperature, and $w_1$ and $w_2$ are weights ranging between zero and one.

27. The system of claim 25, wherein the system objective function F is $F=w_1(T_c-T_{c\ ref})^2+w_2(T_f-T_{f\ ref})^2+w_3(T_p-T_{p\ ref})$, wherein $T_{c\ ref}$ is a concentrate reference temperature, $T_{f\ ref}$ is a feed reference temperature, and $T_{p\ ref}$ is a permeate reference temperature, and $w_1$, $w_2$, and $w_3$ are weights ranging between zero and one.

28. A system for concentrating a liquid feed, the system comprising:
    a membrane system configured to receive the liquid feed and produce a concentrate and a permeate, the membrane system including:
        a graphene oxide membrane configured to operate at a membrane temperature of at least 60° C.; and
        an active cooling system;
    a heat exchanger in fluid communication with the membrane system and disposed upstream of the membrane system such that the liquid feed enters the membrane system immediately after exiting the heat exchanger, the heat exchanger configured to cool the liquid feed and heat the concentrate by transferring heat from the liquid feed to the concentrate; and
a controller configured to:
determine a temperature of the concentrate before the concentrate enters the heat exchanger or after the concentrate leaves the heat exchanger; and
adjust a heat transfer rate between the liquid feed and the concentrate based on the determined temperature of the concentrate.

29. The system of claim 28, wherein the liquid feed comprises black liquor.

30. The system of claim 28, wherein the active cooling system includes at least one of a water sprayer, a heat sink with cooling fins, or a membrane system heat exchanger.

31. The system of claim 28, wherein adjusting the heat transfer rate includes reducing or increasing an effective heat transfer area of the heat exchanger.

32. A system for concentrating a liquid feed, the system comprising:
a membrane system configured to receive the liquid feed and produce a concentrate and a permeate, the membrane system including:
a graphene oxide membrane configured to operate at a membrane temperature of at least 60° C.; and
an active cooling system;
a heat exchanger in fluid communication with the membrane system and disposed upstream of the membrane system such that the liquid feed enters the membrane system immediately after exiting the heat exchanger, the heat exchanger configured to cool the liquid feed and heat the concentrate by transferring heat from the liquid feed to the concentrate; and
a controller configured to determine the membrane temperature and adjust a heat transfer rate between the liquid feed and the concentrate based on the determined membrane temperature.

33. The system of claim 32, wherein the controller is further configured to:
increase a temperature of the liquid feed if the membrane temperature is below a target temperature value; and
decrease the temperature of the liquid feed if the membrane temperature is above the target temperature value.

34. The system of claim 32, wherein a temperature difference between the concentrate prior to entering the heat exchanger and the liquid feed prior to entering the heat exchanger is between about 10-40 degrees Celsius.

35. A system for concentrating a liquid feed, the system comprising:
a membrane system configured to receive the liquid feed and produce a concentrate and a permeate, the membrane system including:
a graphene oxide membrane configured to operate at a membrane temperature of at least 60° C.; and
an active cooling system;
a heat exchanger in fluid communication with the membrane system and disposed upstream of the membrane system such that the liquid feed enters the membrane system immediately after exiting the heat exchanger, the heat exchanger configured to cool the liquid feed and heat the concentrate by transferring heat from the liquid feed to the concentrate; and
a controller configured to:
determine a temperature ($T_c$) of the concentrate;
determine a temperature ($T_f$) of the liquid feed; and
adjust a heat transfer rate between the liquid feed and the concentrate based on the determined $T_c$ and $T_f$ to minimize a system objective function F.

36. The system of claim 35, wherein the system objective function F is $F=w_1(T_c-T_{c\,ref})^2+w_2(T_f-T_{f\,ref})^2$, wherein $T_{c\,ref}$ is a concentrate reference temperature, and $T_{f\,ref}$ is a liquid feed reference temperature, and $w_1$ and $w_2$ are weights ranging between zero and one.

37. A system for concentrating a liquid feed, the system comprising:
a membrane system configured to receive the liquid feed and produce a concentrate and a permeate, the membrane system including:
a graphene oxide membrane configured to operate at a membrane temperature of at least 60° C.; and
an active cooling system;
a heat exchanger in fluid communication with the membrane system and disposed upstream of the membrane system such that the liquid feed enters the membrane system immediately after exiting the heat exchanger, the heat exchanger configured to cool the liquid feed and heat the concentrate by transferring heat from the liquid feed to the concentrate; and
a controller configured to:
determine a change in a flow rate of the liquid feed; and
adjust a heat transfer rate in the heat exchanger based on the determined change in the flow rate of the liquid feed.

38. The system of claim 37, wherein the membrane system further includes a passive cooling, the controller being further configured to:
adjust an operation of the active cooling system based on the determined change in the flow rate of the liquid feed.

39. A system for concentrating a liquid feed, the system comprising:
a membrane system configured to receive the liquid feed and produce a concentrate and a permeate, the membrane system including:
an active cooling system, a passive cooling system, or a combination thereof; and
a graphene oxide membrane configured to operate at a membrane temperature of at least 60° C.;
a first heat exchanger in fluid communication with the membrane system and disposed upstream of the membrane system;
a second heat exchanger in fluid communication with both the first heat exchanger and the membrane system and disposed between the first heat exchanger and the membrane system, such that the liquid feed enters the first heat exchanger, the second heat exchanger, and the membrane system sequentially; and
a controller configured to:
determine a change in a flow rate of the liquid feed; and
adjust a heat transfer rate in the first heat exchanger or the second heat exchanger based on the determined change in the flow rate of the liquid feed;
wherein:
the first heat exchanger is configured to cool the liquid feed and heat the concentrate by transferring heat from the liquid feed to the concentrate; and
the second heat exchanger is configured to cool the liquid feed and heat the permeate by transferring heat from the liquid feed to the permeate.

40. The system of claim 39, wherein the liquid feed includes black liquor.

41. The system of claim 39, wherein adjusting the heat transfer rate in the first heat exchanger or the second heat exchanger includes reducing or increasing an effective heat transfer area of the first heat exchanger or the second heat exchanger.

42. A system for concentrating a liquid feed, the system comprising:
   a membrane system configured to receive the liquid feed and produce a concentrate and a permeate, the membrane system including:
      an active cooling system, a passive cooling system, or a combination thereof; and
      a graphene oxide membrane configured to operate at a membrane temperature of at least 60° C.;
   a first heat exchanger in fluid communication with the membrane system and disposed upstream of the membrane system;
   a second heat exchanger in fluid communication with both the first heat exchanger and the membrane system and disposed between the first heat exchanger and the membrane system, such that the liquid feed enters the first heat exchanger, the second heat exchanger, and the membrane system sequentially; and
   a controller configured to:
      determine a temperature ($T_c$) of the concentrate;
      determine a temperature ($T_f$) of the liquid feed;
      determine a temperature ($T_p$) of the permeate; and
      adjust a heat flow between the liquid feed and the concentrate and between the liquid feed and the permeate based on the determined $T_c$, $T_f$, and $T_p$ to minimize a system objective function F;
   wherein:
      the first heat exchanger is configured to cool the liquid feed and heat the concentrate by transferring heat from the liquid feed to the concentrate; and
      the second heat exchanger is configured to cool the liquid feed and heat the permeate by transferring heat from the liquid feed to the permeate.

43. The system of claim 42, wherein the system objective function F is $F = w_1(T_c - T_{c\ ref})^2 + w_2(T_f - T_{f\ ref})^2 + w_3(T_p - T_{p\ ref})$, wherein $T_{c\ ref}$ is a concentrate reference temperature, $T_{f\ ref}$ is a feed reference temperature, and $T_{p\ ref}$ is a permeate reference temperature, and $w_1$, $w_2$, and $w_3$ are weights ranging between zero and one.

* * * * *